(12) United States Patent
Atarashi

(10) Patent No.: US 7,999,501 B2
(45) Date of Patent: Aug. 16, 2011

(54) MOTOR CONTROLLER

(75) Inventor: Hirofumi Atarashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 508 days.

(21) Appl. No.: 12/178,275

(22) Filed: Jul. 23, 2008

(65) Prior Publication Data

US 2009/0026999 A1    Jan. 29, 2009

(30) Foreign Application Priority Data

Jul. 24, 2007  (JP) .................................. 2007-191562

(51) Int. Cl.
*H02P 7/06* (2006.01)
*H02P 21/00* (2006.01)

(52) U.S. Cl. .............. 318/720; 318/400.02; 318/400.01; 310/156.35

(58) Field of Classification Search .................. 310/162, 310/164, 261, 156.54, 156.55, 156.01, 156.35; 318/400.101, 84, 529, 690, 400.01, 400.02, 318/400.3, 720

See application file for complete search history.

(56) References Cited

U.S. PATENT DOCUMENTS

| 6,426,577 | B1 * | 7/2002 | Sekiyama et al. ............. 310/162 |
| 7,608,965 | B2 * | 10/2009 | Aydin et al. ............... 310/156.32 |
| 7,629,724 | B2 * | 12/2009 | Tanno et al. .................... 310/268 |
| 7,679,260 | B2 * | 3/2010 | Yamamoto et al. ........... 310/268 |
| 7,737,594 | B2 * | 6/2010 | Abe et al. .................. 310/156.53 |
| 2002/0047433 | A1 * | 4/2002 | Sekiyama et al. ....... 310/156.55 |
| 2004/0145265 | A1 | 7/2004 | Heiberger et al. |
| 2006/0113856 | A1 * | 6/2006 | Tanno et al. .............. 310/156.37 |
| 2006/0273676 | A1 * | 12/2006 | Naruse et al. ............ 310/156.32 |
| 2007/0046124 | A1 | 3/2007 | Aydin et al. |
| 2008/0129136 | A1 * | 6/2008 | Abe et al. .................. 310/156.35 |
| 2008/0290752 | A1 * | 11/2008 | Yamamoto et al. ...... 310/156.36 |

FOREIGN PATENT DOCUMENTS

| EP | 0533359 A2 | 3/1993 |
| EP | 1410942 A2 | 4/2004 |
| JP | 57-145561 A | 9/1982 |
| JP | 4-236188 A | 8/1992 |
| JP | 10-271784 A | 10/1998 |
| JP | 2001-136721 A | 5/2001 |
| JP | 2001-159505 A | 6/2001 |
| JP | 2002-369467 A | 12/2002 |

(Continued)

OTHER PUBLICATIONS

Japanese Office Action dated Apr. 28, 2009, issued in corresponding Japanese Patent Application No. 2007-191562.

(Continued)

*Primary Examiner* — Paul Ip

(74) *Attorney, Agent, or Firm* — Westerman, Hattori, Daniels & Adrian, LLP

(57) ABSTRACT

A motor controller (2) for an axial-gap motor (1), which has a rotor (3), two stators (4, 5) disposed on both sides of the rotor (3) in the axial direction, and armature windings (6, 7) wrapped around the stators (4, 5), includes a field current controller (43, 44) which adjusts the field current in the current supplied to the armature windings (6, 7) of at least one of the stators (4, 5) so as to restrain a thrust force acting on the rotor (3) in the axial direction of the rotor (3). This restrains the thrust force acting on the rotor (3) of the axial-gap motor (1).

15 Claims, 6 Drawing Sheets

FOREIGN PATENT DOCUMENTS

| | | |
|---|---|---|
| JP | 2004-72879 A | 3/2004 |
| JP | 2005-304101 A | 10/2005 |
| JP | 2007-151321 A | 6/2007 |
| JP | 2007-162725 A | 6/2007 |

OTHER PUBLICATIONS

European Search Report dated Sep. 10, 2008, issued in corresponding European Patent Application No. 08160620.4.

* cited by examiner

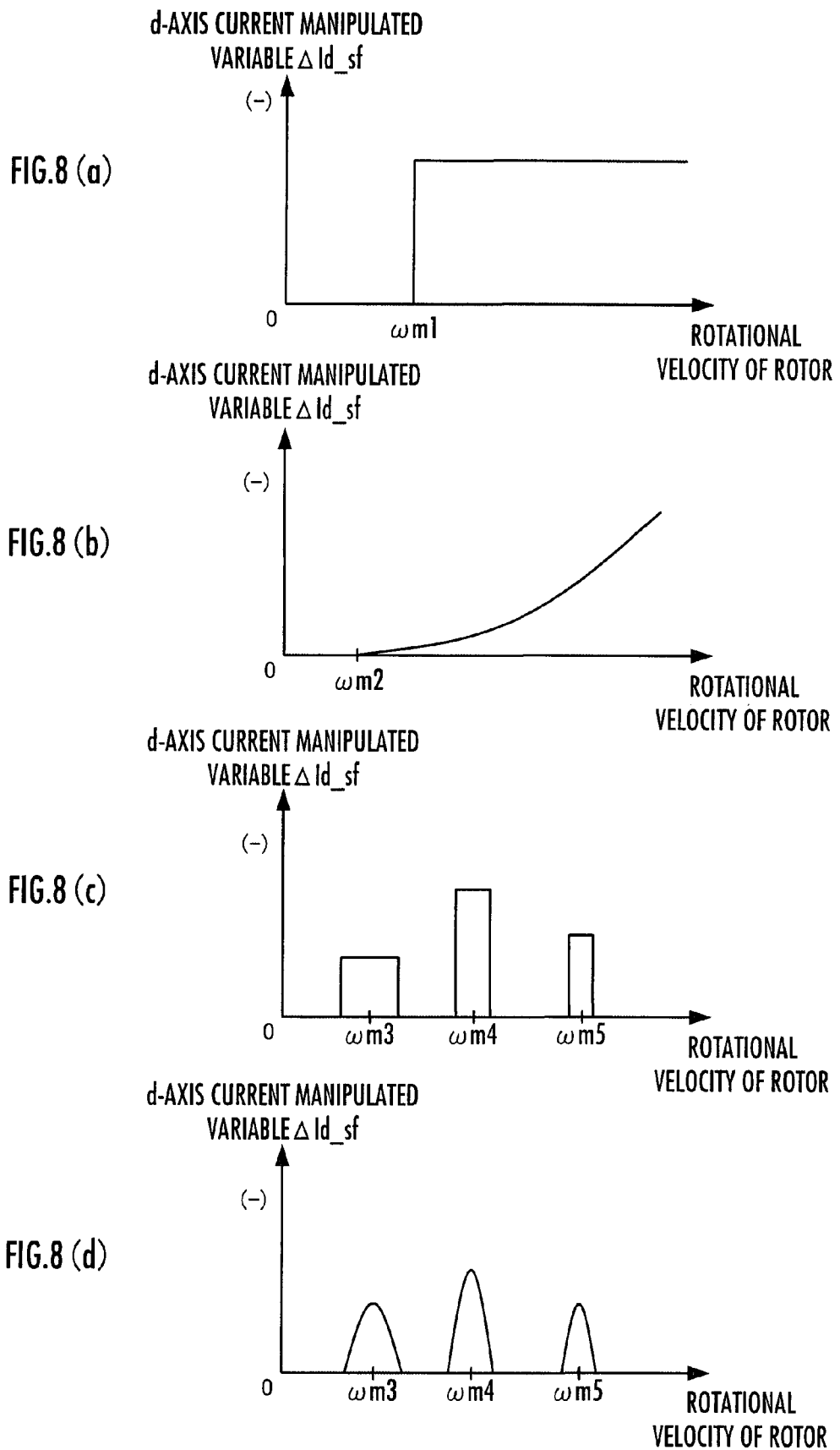

MOTOR CONTROLLER

BACKGROUND OF THE INVENTION

1. Field of the Invention

The present invention relates to a controller for an axial-gap motor.

2. Description of the Related Art

Hitherto, there has been known an axial-gap motor equipped with a rotor having permanent magnets, two stators provided, one on each side of the rotor, in the axial direction of the rotor, and armature windings wrapped around each of the stators, as disclosed in, for example, Japanese Unexamined Patent Application Publication No. H10-271784 (hereinafter referred to as patent document 1) and Japanese Unexamined Patent Application Publication No. 2001-136721 (hereinafter referred to as patent document 2). Such an axial-gap motor is capable of generating a relatively high output torque while reducing the length of the rotor of the motor in the axial direction.

In an axial-gap motor, an attraction force is generated in the axial direction or the thrust direction of the rotor between the rotor and each of the stators due to magnetic fluxes produced by the permanent magnets provided in the rotor. In this case, if the position of the rotor in the axial direction is a position where the magnitudes of the attraction forces between the rotor and the individual stators are the same (hereinafter referred to as "the neutral position"), then the attraction forces usually cancel each other, so that the forces or the thrusting forces in the axial direction do not act on the rotor. Normally, in an axial-gap motor, one stator and the armature windings wrapped around the one stator and the other stator and the armature windings wrapped around the other stator share the same construction. Therefore, the aforesaid neutral position is usually a position at which the interval or the gap between the rotor and one stator is the same as that between the rotor and the other stator.

However, there is a case where the position of the rotor in the axial direction deviates from the neutral position because of an assembly error of the motor or a dimensional error of individual constituent elements, or the like. In such a case, the rotor will be subjected to a thrust force toward one of the stators. Especially when the rotor is provided with permanent magnets in a Halbach array, the rotor will be subjected to a relatively large thrust force even if the rotor is slightly dislocated from the neutral position, because the density of the magnetic fluxes generated from the rotor is high.

If the motor is run, rotating the rotor while the rotor is being subjected to a thrust force as described above, the bearing that supports the rotor or an output shaft connected thereto onto the housing of the motor will be subjected to the thrust force between itself and the housing. This inconveniently leads to wear or the like on the bearing with resultant deteriorated durability of the bearing or mechanical resonance which causes vibration in the thrust direction.

SUMMARY OF THE INVENTION

The present invention has been made with a view of the background described above, and it is an object of the invention to provide a controller capable of restraining a thrust force acting on a rotor when the thrust force caused by a magnetic flux generated by permanent magnets provided in the rotor in an axial-gap motor acts.

To this end, a motor controller according to the present invention is a controller for an axial-gap motor equipped with a rotor having permanent magnets, two stators provided on both sides of the rotor in the axial direction of the rotor, and armature windings wrapped around the two stators, respectively, the controller including a field current controller for adjusting a field current of a current passed through the armature winding of at least one of the two stators so as to restrain a thrust force acting on the rotor in the axial direction of the rotor (a first aspect of the invention).

More specifically, the field current of the current passed through the armature winding of each stator generates a magnetic flux which weakens or strengthens a magnetic flux generated by the permanent magnets of the rotor. Hence, adjusting the field current of the armature winding of at least one of the stators makes it possible to adjust a force, i.e., an attraction force or a repulsive force, acting in the axial direction of the rotor between the stator and the rotor. Thus, according to the first aspect of the invention, even in the case where a thrust force from magnetic fluxes generated by the permanent magnets of the rotor acts on the rotor, a thrust force in a direction for canceling the thrust force caused by the magnetic fluxes generated by the permanent magnet of the rotor can be applied to the rotor by adjusting the field current. This makes it possible to restrain the total thrust force actually acting on the rotor. Moreover, it is possible to prevent an excessive thrust force from acting on a bearing which supports the rotor and the output shaft attached thereto on the housing of the motor thereby to restrain damage to or deterioration of the bearing from developing. It is also possible to restrain vibration of the motor caused by a resonance in the thrust direction. Furthermore, the required rigidity of the bearing and the housing can be reduced, so that the cost and the sizes of the parts of the motor can be reduced.

In the explanation of the present invention, a thrust force attributable to the magnetic fluxes generated by the permanent magnets of the rotor (hereinafter referred to "the magnet magnetic fluxes" in some cases) means the resultant force of the attraction force acting between one stator and the rotor produced by the magnet magnetic fluxes and the attraction force acting between the other stator and the rotor. The thrust force attributable to the magnet magnetic fluxes acting on the rotor means that the attraction force acting between one stator and the rotor due to the magnet magnetic fluxes and the attraction force acting between the other stator and the rotor are not balanced, that is, these attraction forces are different from each other, and the resultant force of the attraction forces has a non-zero magnitude.

In the first aspect of the invention, there are a variety of methods for adjusting field currents. For example, the field current controller adjusts the field currents of the armature windings of both stators by adding field current components in a field weakening direction which have the same magnitude to the field currents of the armature windings of the two stators when a thrust force attributable to the magnetic fluxes generated from the permanent magnets acts on the rotor (a second aspect of the invention).

According to the second aspect of the invention, the field current components in the field weakening direction added to the field currents of the armature windings of the two stators cause the armature windings of the stators to generate magnetic fluxes in the opposite direction from that of the above magnet magnetic fluxes thereby generating repulsive forces between the stators and the rotor. In this case, setting appropriate magnitudes of the field current components added to the field currents of the armature windings makes it possible to turn the resultant force of the repulsive forces on the two stators generated between each stator and the rotor into a force in a direction for canceling the thrust force acting on the rotor due to the magnet magnetic fluxes. More specifically, it is assumed that the thrust force acting on the rotor due to the magnetic fluxes generated from the permanent magnets is a thrust force in the direction from a first stator, which is one of the two stators, toward a second stator, which is the other stator. At this time, the magnitude of the field current component of each armature winding is set such that the repulsive force generated between the second stator and the rotor due to the magnetic fluxes generated by the field current component of the armature winding of the second stator is larger than the repulsive force generated between the first stator and the rotor due to the magnetic fluxes generated by the field current component of the armature winding of the first stator. With this arrangement, the resultant force of the repulsive forces on the two stators generated between the stators and rotor provides the force in the direction for canceling the thrust force acting on the rotor due to the magnet magnetic fluxes. This makes it possible to restrain a total thrust force acting on the rotor.

If one stator and the armature windings wrapped around it and the other stator and the armature windings wrapped around it share the same construction, then the magnitudes of the field current components in the field weakening direction added to the field currents of the armature windings of the two stators may be the same. Further, the second aspect of the invention may be applied to a case where current is supplied to the armature windings of the two stators from a different inverter circuit for each stator and a case where the armature winding of each phase of the two stators is connected in series for each phase to supply current to the armature winding of each phase of the two stators from a single inverter circuit.

In the first aspect of the invention, if the thrust force acting on the rotor due to the magnetic fluxes generated from the permanent magnet is a thrust force in the direction from the first stator, which is one of the two stators, toward a second stator, which is the other stator, then the field current controller may adjust the field current of the armature windings of the second stator by adding the field current component in the field weakening direction to the field current of the armature windings of the second stator (a third aspect of the invention).

According to the third aspect of the invention, the field current component in the field weakening direction added to the field current of the armature windings of the second stator causes the armature windings of the second stator to generate magnetic fluxes in the opposite direction from that of the above magnet magnetic fluxes thereby generating a repulsive force between the second stator and the rotor. The repulsive force acting on the rotor provides a force in the direction for cancelling a thrust force acting on the rotor due to the magnetic fluxes generated from the permanent magnets. Thus, the total thrust force acting on the rotor can be restrained.

In the first aspect of the invention, if the thrust force acting on the rotor due to the magnetic fluxes generated from the permanent magnet is a thrust force in the direction from the first stator, which is one of the two stators, toward a second stator, which is the other stator, then the field current controller may adjust the field current of the armature windings of the first stator by adding the field current component in the field strengthening direction to the field current of the armature windings of the first stator (a fourth aspect of the invention).

According to the fourth aspect of the invention, the field current component in the field strengthening direction added to the field current of the armature windings of the first stator causes magnetic fluxes in the same direction as that of the magnet magnetic fluxes to be generated from the armature windings of the first stator, thus generating an attraction force to be produced between the first stator and the rotor. The attraction force acting on the rotor provides a force canceling the thrust force acting on the rotor due to the magnetic fluxes generated from the permanent magnets. Thus, the total thrust force acting on the rotor can be restrained.

Further, in the first aspect of the invention, if the thrust force acting on the rotor due to the magnetic fluxes generated from the permanent magnets is a thrust force in the direction from the first stator, which is one of the two stators, toward a second stator, which is the other stator, then the field current controller may adjust the field currents of the armature windings of the two stators by adding the field current component in the field strengthening direction to the field current of the armature windings of the first stator and also adding the field current component in the field weakening direction to the field current of the armature windings of the second stator (a fifth aspect of the invention).

According to the fifth aspect of the invention, the field current component in the field strengthening direction added to the field current of the armature winding of the first stator causes an attraction force to be produced between the rotor and the first stator, as with the aforesaid fourth aspect of the invention. At the same time, the field current component in the field weakening direction added to the field current of the armature winding of the second stator causes a repulsive force to be produced between the rotor and the second stator, as with the aforesaid third aspect of the invention. The attraction force and the repulsive force acting on the rotor provide a force in the direction for canceling the thrust force acting on the rotor due to the magnetic fluxes generated from the permanent magnets. This arrangement allows a total thrust force acting on the rotor to be restrained.

In the first to the fifth aspects of the invention explained above, providing a thrust force generation detector which outputs a detection signal based on a relative position of the rotor in relation to the two stators in the axial direction or a thrust force acting on the rotor makes it possible to detect, as necessary, the generation of a thrust force acting on the rotor (e.g., whether or not a thrust force acts on the rotor or the direction of an acting thrust force) while the motor is running.

If the thrust force generation detector is provided as described above, in the aforesaid first aspect of the invention, the field current controller preferably adjusts the field current of the armature windings of at least one of the armature windings of the two stators according to an output of the thrust force generation detector (a sixth aspect of the invention).

Similarly, in the second aspect or the fifth aspect of the invention described above, the field current controller preferably has a device which determines the field current component to be added to the field current of the armature windings of each stator according to an output of the thrust force generation detector (a seventh aspect of the invention).

Similarly, in the aforesaid third aspect of the invention, the field current controller preferably has a device which determines the field current component to be added to the field current of the armature windings of the second stator according to an output of the thrust force generation detector (an eighth aspect of the invention).

Similarly, in the aforesaid fourth aspect of the invention, the field current controller preferably has a device which determines the field current component to be added to the field current of the armature windings of the first stator according to an output of the thrust force generation detector (a ninth aspect of the invention).

According to the sixth to the ninth aspects of the invention, the field current of the armature windings to be adjusted can be feedback-controlled on the basis of the generation of an actual thrust force while the motor is in operation. Thus, a total thrust force acting on the rotor can be restrained appropriately. For example, the total thrust force can be restrained such that the thrust force always remains to be zero or an extremely small force while the motor is in operation.

In this case, for example, if the thrust force generation detector is adapted to output a detection signal based on a relative position of the rotor with respect to the two stators in the axial direction, then the field current of the armature windings to be adjusted may be adjusted on the basis of a difference between an actual relative position recognized by means of the detection signal and a desired relative position at which the thrust force acting on the rotor due to the magnet magnetic fluxes becomes zero. Further, if, for example, the thrust force generation detector is adapted to output a detection signal based on a thrust force acting on the rotor, then the field current of the armature windings to be adjusted may be adjusted on the basis of a difference between an actual thrust force recognized by the detection signal and a desired thrust force (zero or an extremely small thrust force).

The thrust force generation detector may be constituted by, for example, a pair of search coils attached to the two stators such that they oppose each other (a tenth aspect of the invention). In this case, when the rotor rotates, magnetic fluxes interlinked with each search coil cause the search coil to generate a voltage. Then, the voltages generated in the individual search coils produce a voltage difference based on the relative position of the rotor with respect to the two stators. Hence, the relative position of the rotor with respect to the two stators can be recognized on the basis of the voltage difference.

The generation of thrust forces acting on rotors can be also checked by an inspection on a manufacturing line or the like of motors. In such a case, setting data for specifying a manipulated variable of a field current for restraining a thrust force acting on a rotor may be stored for each motor.

In this case, in the aforesaid first aspect of the invention, preferably, setting data that defines the relationship between the rotational speed of the rotor and the manipulated variable of the field current of the armature windings of at least either one of the two stators is provided beforehand, and the field current controller adjusts a field current component to be supplied to the armature windings of at least one stator of the two stators on the basis of the manipulated variable determined on the basis of a detection value of the rotational speed of the rotor and the setting data (an eleventh aspect of the invention).

Similarly, in the second aspect of the invention or the fifth aspect of the invention described above, preferably, setting data that defines the relationship between the rotational speed of the rotor and the field current component to be added to the field current of the armature windings of each stator is provided beforehand, and the field current controller determines the field current component to be added to the field current of the armature windings of each stator on the basis of a detection value of the rotational speed of the rotor and the setting data (a twelfth aspect of the invention).

Similarly, in the aforesaid third aspect of the invention, preferably, setting data that defines the relationship between the rotational speed of the rotor and the field current component to be added to the field current of the armature windings of the second stator is provided beforehand, and the field current controller determines the field current component to be added to the field current of the armature windings of the second stator on the basis of a detection value of the rotational speed of the rotor and the setting data (a thirteenth aspect of the invention).

Similarly, in the aforesaid fourth aspect of the invention, preferably, setting data that defines the relationship between the rotational speed of the rotor and the field current component to be added to the field current of the armature windings of the first stator is provided beforehand, and the field current controller determines the field current component to be added to the field current of the armature windings of the first stator on the basis of a detection value of the rotational speed of the rotor and the setting data (a fourteenth aspect of the invention).

According to the eleventh to the fourteenth aspects of the invention described above, the field current of the armature windings to be adjusted is adjusted on the basis of the rotational speed of the rotor, so that the thrust force can be restrained at a desired rotational speed range suited for restraining the thrust force acting on the rotor. For example, in a low speed range in which the rotational speed of the rotor is low, even if a thrust force acts on the bearing, the bearing is unlikely to easily develop damage or deterioration; so that the field current can be adjusted such that a thrust force is restrained only in a rotational speed range other than the low speed range. Further, in a case where the rotational speed of the rotor is a speed in the vicinity of a particular rotational speed and a mechanical resonance phenomenon in the thrust direction is likely to occur, the field current can be adjusted such that a thrust force is restrained only in a speed range in the vicinity of the particular rotational speed.

Incidentally, the first to the fourteenth aspects of the invention described above are ideally applied when the permanent magnets of the rotor are provided in the rotor such that the pole configuration of the rotor is a Halbach array (a fifteenth aspect of the invention). This is because, in a motor provided with such a rotor, the magnetic flux density of the magnet magnetic fluxes is high, so that a thrust force acting on the rotor tends to be large due to an error of the relative position of the rotor with respect to the two stators (an error of a relative position at which a thrust force acting on the rotor due to a magnet magnetic fluxes becomes zero).

BRIEF DESCRIPTION OF THE DRAWINGS

FIGS. 8(a) to 8(d) are graphs illustrating examples of setting data (data table) used in a fourth modification related to the embodiments of the present invention.

DESCRIPTION OF THE PREFERRED EMBODIMENTS

First Embodiment

A first embodiment of a motor controller in accordance with the present invention will be explained with reference to FIG. 1 to FIG. 6. The present embodiment is an embodiment of the second aspect of the invention.

Figure 1:
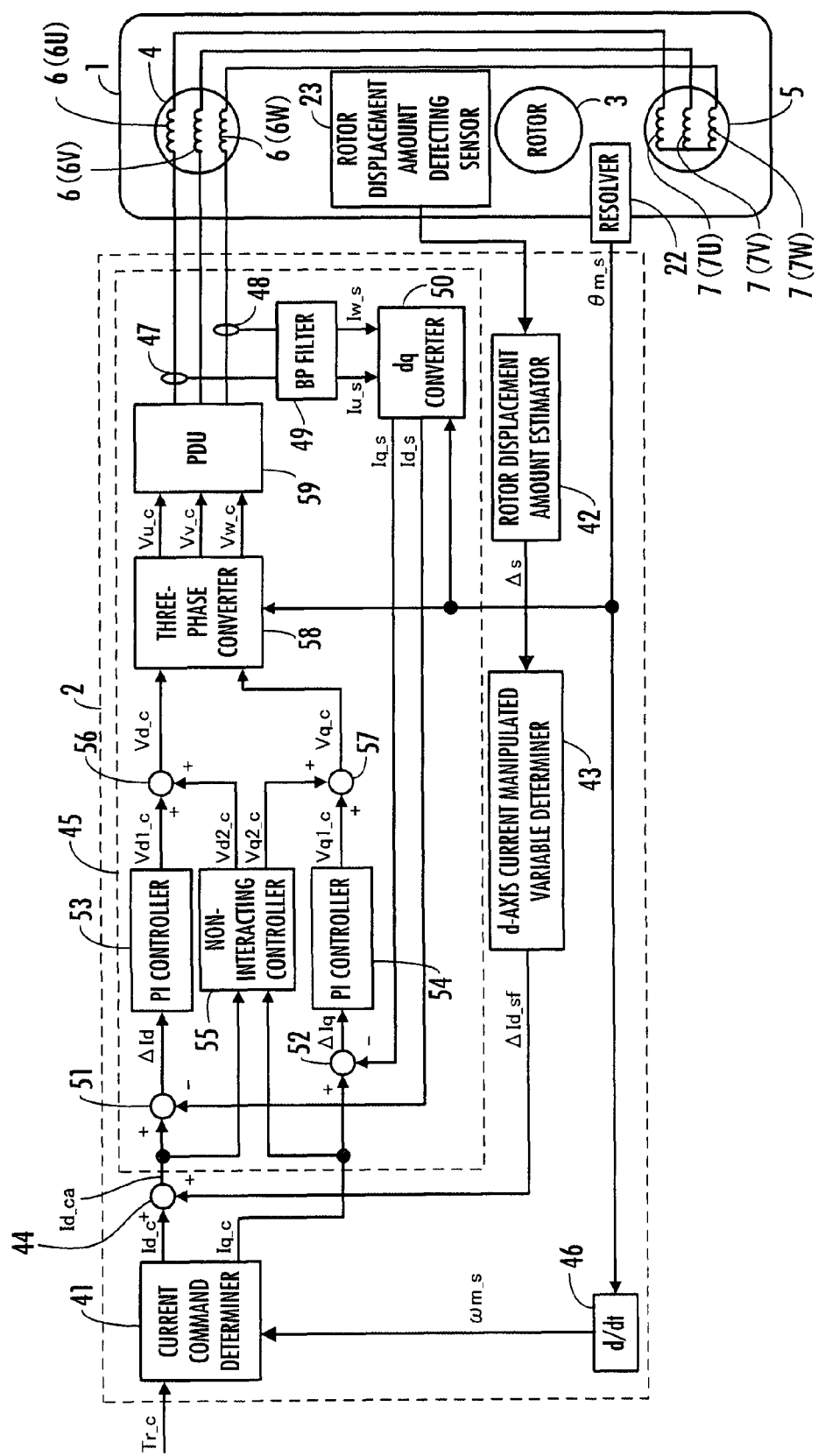
FIG. 1 is a block diagram illustrating a general construction of a controller of a motor in a first embodiment of the present invention.

Referring to FIG. 1, reference numeral 1 denotes a motor, and reference numeral 2 denotes a controller which controls the operation of the motor 1.

The motor 1 is an axial-gap motor equipped with a rotor 3, two stators 4 and 5, and armature windings 6 and 7 wrapped around the stators 4 and 5, respectively. The motor 1 is mounted in, for example, an electric vehicle or a hybrid vehicle, as a generating source to generate a driving force for the vehicle. The motor 1 can be run in a power running mode and a regenerative mode.

The constructions of the rotor 3 and the stators 4 and 5 of the motor 1 will be explained in further detail with reference to FIG. 2 to FIG. 4.

Figure 3:
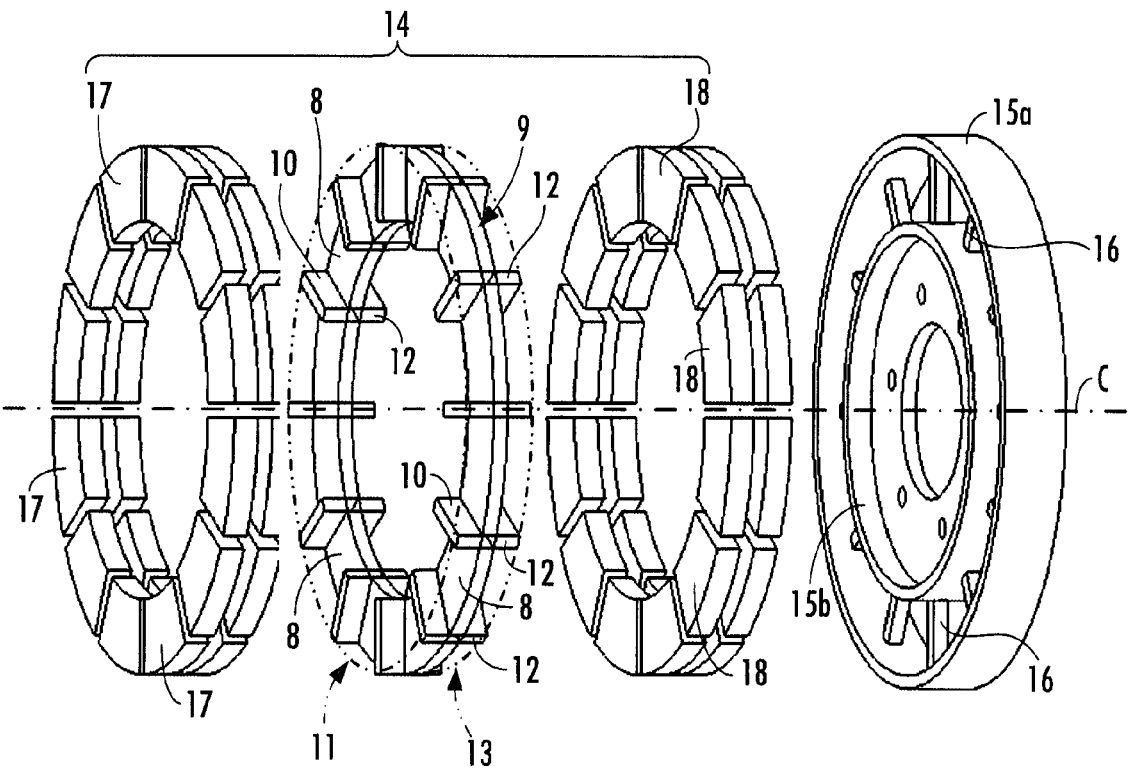
FIG. 3 is an exploded perspective view of the rotor illustrated in FIG. 2.
Figure 4:
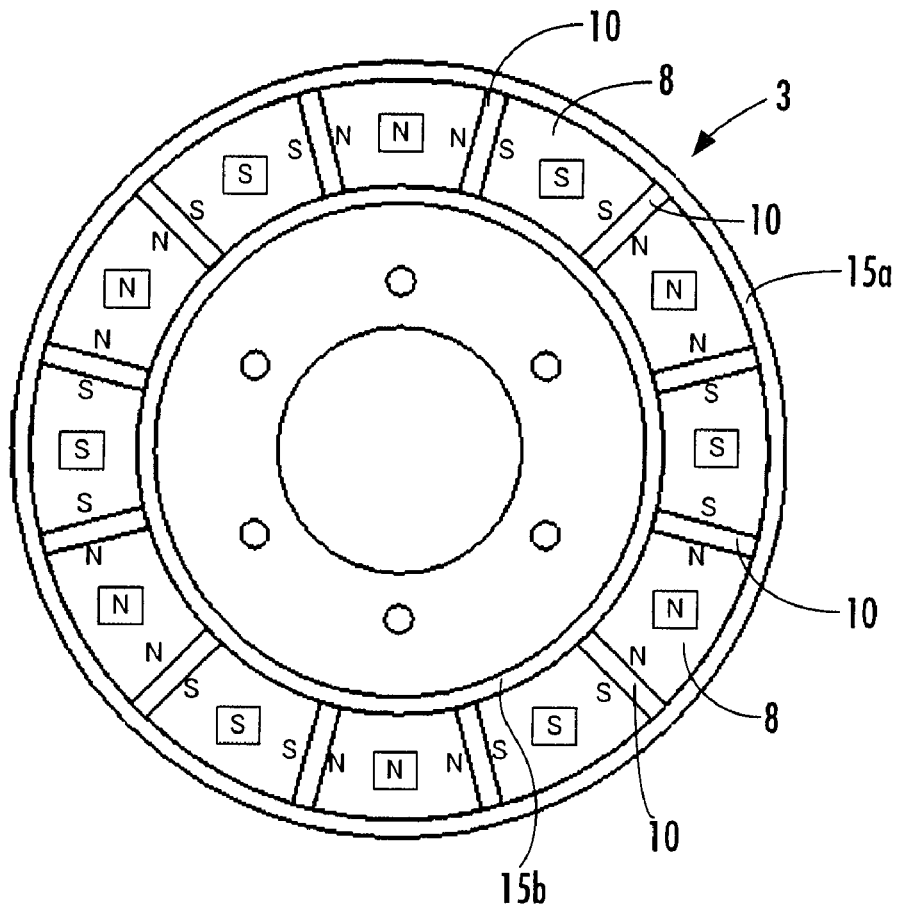
FIG. 4 is a view illustrating the pole configuration as observed in the axial direction of the rotor illustrated in FIG. 2.

As shown in FIG. 3, the rotor 3 has an approximately annular shape and includes an annular magnetic structure 14 which has an annular primary permanent magnet layer 9 having a plurality of fan-shaped primary permanent magnets 8, an annular first auxiliary permanent magnet layer 11 having a plurality of square-plate-shaped auxiliary permanent magnets 10, an annular second auxiliary permanent magnet layer 13 having a plurality of square-plate-shaped auxiliary permanent magnets 12, which are all coaxially stacked, the primary permanent magnet layer 9 being sandwiched between the two auxiliary permanent magnet layers 11 and 13, and an outer cylindrical frame 15a attached to the outer circumferential surface of the magnetic structure 14 and an inner cylindrical frame 15b attached to the inner circumferential surface of the magnetic structure 14. In the present embodiment, the number of the primary permanent magnets 8, the number of the auxiliary permanent magnets 10, and the number of the auxiliary permanent magnets 12 are the same (12 each in the illustrated example). The outer cylindrical frame 15a and the inner cylindrical frame 15b are coaxially connected through the intermediary of a plurality of (the same number as that of each of the primary permanent magnets 8, the auxiliary permanent magnets 10, and the auxiliary permanent magnets 12) joints 16 radially extended between the inner circumferential surface of the outer cylindrical frame 15a and the outer circumferential surface of the inner cylindrical frame 15b, and formed in one piece, including the joints 16, by a nonmagnetic material.

The plurality of fan-shaped primary permanent magnets 8 of the primary permanent magnet layer 9 are annularly arranged in the circumferential direction of the rotor 3, the thickness thereof facing an axial center C of the rotor 3, thus constituting the primary permanent magnet layer 9.

The plurality of square-plate-shaped auxiliary permanent magnets 10 of the first auxiliary permanent magnet layer 11 are arranged, with the thickness thereof facing the circumference of the rotor 3 (more specifically, facing the tangent of the circumference having a point on the axial center C of the rotor 3 as the central point thereof), at equiangular intervals in the circumferential direction. Therefore, these auxiliary permanent magnets 10 are radially arranged, as illustrated in FIG. 4, when observed in the direction of the axial center C of the rotor 3. In this case, the position (the angular position) of each of the auxiliary permanent magnets 10 in the circumferential direction of the rotor 3 is between the primary permanent magnets 8 and 8 adjoining each other in the circumferential direction of the rotor 3. In other words, the auxiliary permanent magnets 10 are arranged such that the auxiliary permanent magnets 10 are positioned at both ends of each primary permanent magnet 8 in the circumferential direction of the rotor 3.

Further, a magnetic yoke 17 having the same shape (the fan-plate shape) as each primary permanent magnet 8 is installed, with its width facing the axial center C of the rotor 3, at the space between the auxiliary permanent magnets 10 and 10 adjoining each other in the circumferential direction of the rotor 3 (at a space opposing each primary permanent magnet 8 in the direction of the width thereof). Thus, in the first auxiliary permanent magnet layer 11, the auxiliary permanent magnets 10 and the magnetic yokes 17 are alternately arranged in the circumferential direction of the rotor 3, and this array constitutes the first auxiliary permanent magnet layer 11. Further, each magnetic yoke 17 is secured to the auxiliary permanent magnets 10 and 10 at both ends thereof and also superposed on the primary permanent magnet 8 between the auxiliary permanent magnets 10 and 10.

As with the auxiliary permanent magnets 10 of the first auxiliary permanent magnet layer 11, the plurality of square-plate-shaped auxiliary permanent magnets 12 of the second auxiliary permanent magnet layer 13 is arranged at equiangular intervals in the circumferential direction, with their widths facing the circumferential direction of the rotor 3. In this case, the position (the angular position) of each auxiliary permanent magnet 12 in the circumferential direction of the rotor 3 is the same as that of each auxiliary permanent magnet 10 of the first auxiliary permanent magnet layer 11. Hence, each auxiliary permanent magnet 10 of the first auxiliary permanent magnet layer 11 and each auxiliary permanent magnet 12 of the second auxiliary permanent magnet layer 13 are paired and arranged in the direction of the axial center C of the rotor 3.

Further, as with the first auxiliary permanent magnet layer 11, a magnetic yoke 18 having the same shape (the fan-plate shape) as that of each primary permanent magnet 8 is installed, with its width facing the axial center C of the rotor 3, at the space between the auxiliary permanent magnets 12 and 12 adjoining each other in the circumferential direction of the rotor 3. Thus, in the second auxiliary permanent magnet layer 13 also, the auxiliary permanent magnets 12 and the magnetic yokes 18 are alternately arranged in the circumferential direction of the rotor 3, and this array constitutes the second auxiliary permanent magnet layer 13. Further, each magnetic yoke 18 is secured to the auxiliary permanent magnets 12 and 12 at both ends thereof and superposed on the primary permanent magnet 8 between the auxiliary permanent magnets 12 and 12.

Assembling the primary permanent magnets 8, the auxiliary permanent magnets 10 and 12, and the magnetic yokes 17 and 18 together as described above constitutes the magnetic structure 14. Then, the outer cylindrical frame 15a is coaxially and externally fitted to the magnetic structure 14 and secured to the outer circumferential surface of the magnetic structure 14. Further, the inner cylindrical frame 15b is coaxially and internally fitted to the magnetic structure 14 and secured to the inner circumferential surface of the magnetic structure 14. Thus, the rotor 3 is constructed. In this case, the magnetic structure 14, the outer cylindrical frame 15a and the inner cylindrical frame 15b are assembled such that each primary permanent magnet 8 is positioned in the space between the adjoining joints 16 and 16 in the circumferential direction of the rotor 3 and each joint 16 is sandwiched between the auxiliary permanent magnets 10 and 12 arranged in the axial direction of the rotor 3. Incidentally, the lengths of the outer cylindrical frame 15a and the inner cylindrical frame 15b in the direction of the axial center C are approximately the same as the length (thickness) of the magnetic structure 14 in the direction of the axial center C. The rotor 3 is configured to be plane-symmetrical with respect to a plane which passes the center thereof in the direction of the axial center C and which is orthogonal to the axial center C.

The magnetic poles of the primary permanent magnets 8 and the auxiliary permanent magnets 10 and 12 will now be explained. Each of the primary permanent magnets 8 is magnetized in the direction of the thickness, one surface thereof in their thickness direction being N-pole, while the other surface thereof being S-pole. Further, the primary permanent magnets 8 and 8 which are adjacent to each other in the circumferential direction of the rotor 3 have their magnetized directions opposite from each other. Therefore, the magnetic poles of the primary permanent magnets 8 on each surface of the primary permanent magnet layer 9 in the direction of the axial center C of the rotor 3, e.g., on the surface adjacent to the first auxiliary permanent magnet layer 11, are arranged such that the N-poles and the S-poles are alternately disposed in the circumferential direction of the rotor 3, as illustrated in FIG. 4 (refer to "N" and "S" enclosed by the blank boxes). The same applies to the surface of the primary permanent magnet layer 9 adjacent to the second primary permanent magnet layer 13. Incidentally, FIG. 4 illustrates the assembly from which the magnetic yokes 17 of the first auxiliary permanent magnet layer 11 have been removed.

Further, the auxiliary permanent magnets 10 of the first auxiliary permanent magnetic layer 11 and the auxiliary permanent magnets 12 of the second auxiliary permanent magnetic layer 13 are also magnetized in the direction of their thicknesses, i.e., in the circumferential direction of the rotor 3, one surface thereof in their thickness direction being N-pole, while the other surface thereof being S-pole. In this case, the magnetic pole of each surface in the thickness direction of the auxiliary permanent magnets 10 is the same as the magnetic pole of the surface of the primary permanent magnet 8 adjacent to the first auxiliary permanent magnetic layer 11, the primary permanent magnet 8 being adjacent to the auxiliary permanent magnet 10 at the side of the aforesaid each surface, as illustrated in FIG. 4 (refer to "N" and "S" enclosed with no blank boxes). Therefore, the magnetic poles of the opposing surfaces of the auxiliary permanent magnets 10 and 10 adjoining each other in the circumferential direction of the rotor 3 are the same as the magnetic pole of the surface of the primary permanent magnet 8 adjacent to the first auxiliary permanent magnetic layer 11, the primary permanent magnet 8 being sandwiched between the aforesaid auxiliary permanent magnets 10 and 10. The same applies to the auxiliary permanent magnets 12 of the second auxiliary permanent magnetic layer 13. In this case, the magnetic poles of the two surfaces of each primary permanent magnet 8 in the thickness direction are opposite from each other, so that the directions of magnetization of the auxiliary permanent magnets 10 and 12 arranged in the direction of the axial center C of the rotor 3 are opposite from each other.

Thus, the rotor 3 having the primary permanent magnets 8 and the auxiliary permanent magnets 10 and 12 has the so-called Halbach array. This makes it possible to obtain a high magnetic flux density in the direction of the axial center C of the rotor 3 by the Halbach effect.

The stators 4 and 5 share the same structure. Further, as illustrated in FIG. 2, each of the stators 4 and 5 has a plurality of teeth 20 provided on one surface of an annular base member 19 in the axial direction thereof such that the teeth 20 project in the axial direction of the base member 19 and are arranged at equiangular intervals around the axial center of the base member 19. The base member 19 and the teeth 20 are made of a magnetic material and formed in one piece. In the example illustrated, each of the stators 4 and 5 has thirty-six teeth 20.

The armature windings 6 and 7 are installed on the stators 4 and 5 such that each of the armature windings 6 and 7 (not shown in FIG. 2) is accommodated in a slot 21, which is a groove between teeth 20 and 20 adjacent to each other in the circumferential direction of the stator. In the present embodiment, each of the armature windings 6 and 7 attached to the stators 4 and 5, respectively, is an armature winding for three phases (U-phase, V-phase, and W-phase). Further, both of the armature windings 6 and 7 are wrapped in the same manner around the stators 4 and 5, respectively. For instance, the armature winding 6 for each phase of the stator 4 is wrapped around the stator 4 such that a predetermined number of winding loops are formed at equiangular intervals in the circumferential direction of the stator 4, as observed in the axial direction of the stator 4. The same applies to the armature winding 7 of the stator 5. Thus, in the present embodiment, the constructions of the stator 4 and the armature winding 6 are the same as the constructions of the stator 5 and the armature winding 7.

In the following explanation, when it is necessary to distinguish the phases (the U-phase, the V-phase, and the W-phase) of the armature windings 6 and 7, the subscripts u, v, and w will be attached. For example, the armature windings 6 for the U-phase, the V-phase, and the W-phase of the stator 4 will be denoted as the armature winding 6$u$, the armature winding 6$v$, and the armature winding 6$w$, respectively.

In the assembled state of the motor 1, these stators 4 and 5 are coaxially disposed with the rotor 3 on both ends in the direction of the axial center C of the rotor 3 such that the stators 4 and 5 sandwich the rotor 3 therebetween, and secured to the housing (not shown) of the motor 1. In this case, the distal surfaces of the teeth 20 of the stators 4 and 5, respectively, closely oppose the rotor 3. Further, the rotor 3 and the stators 4 and 5 are installed in the motor 1 such that the gap between the rotor 3 and the stator 4 in the direction of the axial center C of the rotor 3 (the distance between the surface of the rotor 3 that is adjacent to the stator 4 and the distal surfaces of the teeth 20 of the stator 4) and the gap between the rotor 3 and the stator 5 (the distance between the surface of the rotor 3 that is adjacent to the stator 5 and the distal surfaces of the teeth 20 of the stator 5) are the same, that is, the rotor 3 is positioned at the center between the two stators 4 and 5. Further, in the present embodiment, the stators 4 and 5 are installed in the motor 1 such that, when observed in the direction of the axis of the rotor 3 in the state in which the motor 1 has been assembled, the position (the angular position about the axis) of each of the teeth 20 of the stator 4 and the position (the angular position about the axis) of each of the teeth 20 of the stator 5 coincide with each other. In other words, the individual teeth 20 of the stator 4 and the individual teeth 20 of the stator 5 exactly oppose each other in the direction of the axial center C of the rotor 3. Further, the armature winding 6 of each phase of the stator 4 and the armature winding 7 of the stator 5 of the same phase as the above phase of the armature winding 6 are wrapped around the stators 4 and 5, respectively, such that, for each phase, the winding loops of the armature windings 6 of the stator 4 and the winding loops of the armature windings 7 of the stator 5 oppose each other in the direction of the axial center C of the rotor 3 (such that, when observed in the direction of the axial center C of the rotor 3, the winding loops of the stator 4 and the winding loops of the stator 5 lie at the same angular positions). Hence, the magnetic circuit configuration from the rotor 3 to the stator 4 of the motor 1 is the same as the magnetic circuit configuration from the rotor 3 to the stator 5.

The motor 1 is further provided with an output shaft 1$a$ (refer to the virtual lines in FIG. 2) connected to the rotor 3.

Figure 2:
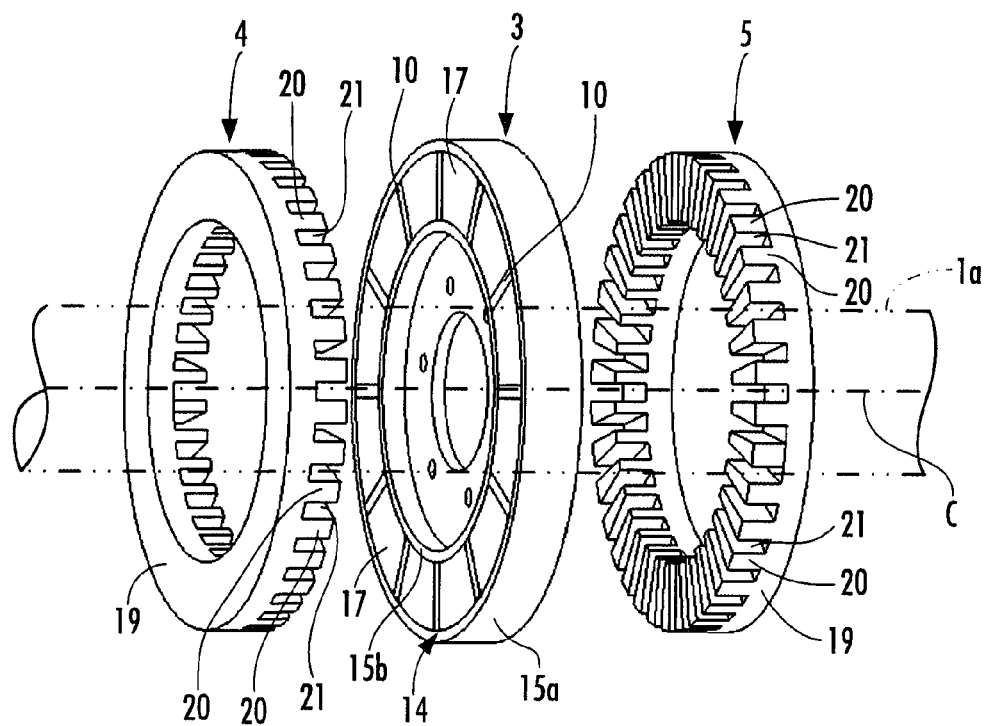
FIG. 2 is a perspective view of a rotor and stators of the motor in the first embodiment.

The output shaft 1a is coaxially installed in the inner cylindrical frame 15b of the rotor 3, penetrating the stators 4 and 5, as shown in FIG. 2. The output shaft 1a is further supported by the housing (or the base members 19 of the stators 4 and 5, respectively) of the motor 1 through the intermediary of a bearing (not shown) such that the output shaft 1a rotates integrally with the rotor 3.

Returning to the explanation of FIG. 1, in the present embodiment, the armature windings 6 of the stator 4 and the armature windings 7 of the stator 5 are connected as described below. Armature windings 6u, 6v, and 6w of the individual phases of the stator 4 and the armature windings 7u, 7v, and 7w of the individual phases of the stator 5 are connected in series. Each of the ends of the armature windings 7u, 7v, and 7w of the individual phases of the stator 5 at the opposite side from the armature windings 6u, 6v, and 6w are interconnected in the form of neutral points. Each of the ends of the armature windings 6u, 6v, and 6w of the individual phases of the stator 4 at the opposite side from the armature windings 7u, 7v, and 7w are connected to a power drive unit 59 of a controller 2, which will be discussed later. Thus, for each phase, the same current always passes between the power drive unit 59 and the armature windings 6u and 7u of the U-phase of the stators 4 and 5, the armature windings 6v and 7v of the V-phase thereof, and the armature windings 6w and 7w of the W-phase thereof.

Further, according to the present embodiment, to control the operation of the motor 1, the motor 1 is provided with a resolver 22 serving as a rotational angle detecting device which detects the rotational angle of the rotor 3, and a rotor displacement amount detecting sensor 23 which outputs a detection signal based on the position of the rotor 3 in the axial direction (the relative position in relation to the stators 4 and 5). The rotor displacement amount detecting sensor 23 corresponds to the thrust force generation detecting means in the present invention.

Here, the rotor 3 is basically installed in the motor 1 such that it is located at the central position (hereinafter referred to as "the neutral position") between the two stators 4 and 5 in the axial direction of the rotor 3, as described above. However, there are cases where the position of the rotor 3 in the axial direction thereof is dislocated from the neutral position due to an assembly error or a dimensional error of a constituent element, such as the housing of the motor 1. The sensor for detecting such dislocation is the aforesaid rotor displacement amount detecting sensor 23.

Figure 5:
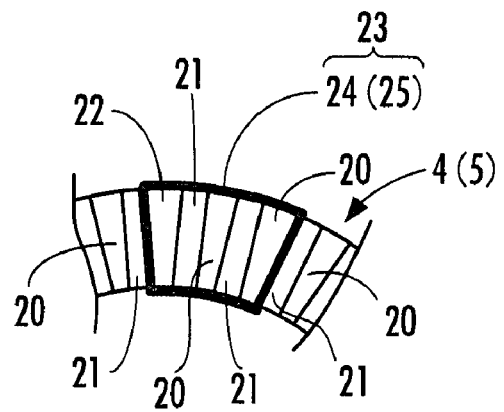
FIG. 5 is a view illustrating a sensor for detecting the amount of displacement of the rotor provided in the apparatus of the first embodiment.

FIG. 5 illustrates the rotor displacement amount detecting sensor 23 in the present embodiment. In the present embodiment, the rotor displacement amount detecting sensor 23 is comprised of a pair of search coils 24 and 25 wrapped around the stators 4 and 5, respectively, in the same manner as the winding loops of the armature windings 6 and 7, as illustrated in FIG. 5. In FIG. 5, the stator 5 and the search coil 25 attached thereto are indicated by parenthesized reference numerals. These search coils 24 and 25 oppose each other in the direction of the axial center C of the rotor 3. The search coils 24 and 25 generate output voltages based on the intensities of magnetic fluxes (magnetic flux densities) interlinking the search coils 24 and 25 as the rotor 3 rotates. The magnetic fluxes interlinking the search coils 24 and 25 are the magnetic fluxes produced by the primary permanent magnets 8 and the auxiliary permanent magnets 10 and 12 of the rotor 3 (hereinafter referred to as "the magnet magnetic fluxes"). The number of windings and the winding loop areas of the search coils 24 and 25 are the same.

The output voltages of the search coils 24 and 25 are based on the relative position of the rotor 3 with respect to the two stators 4 and 5 (the relative position of the rotor 3 in the direction of the axial center C). In other words, in the motor 1 according to the present embodiment, if the rotor 3 is in the neutral position, the intensity of the magnetic fluxes interlinking the search coil 24 adjacent to the stator 4 and the intensity of the magnetic fluxes interlinking the search coil 25 adjacent to the stator 5 substantially agree with each other. In this case, therefore, the output voltages of the search coils 24 and 25 are substantially the same. Meanwhile, if the position of the rotor 3 deviates from the neutral position, then the intensity of the magnetic fluxes interlinking the search coil 24 will be different from the intensity of the magnetic fluxes interlinking the search coil 25. This causes a difference in output voltage between the search coils 24 and 25. For example, if the position of the rotor 3 deviates toward the stator 4 from the neutral position, then the output voltage of the search coil 24 adjacent to the stator 4 will be higher than the output voltage of the search coil 25 adjacent to the stator 5. For this reason, the difference in output voltage between the search coils 24 and 25 provides an indicator that shows the amount of deviation (the amount of displacement) of the position of the rotor 3 from the neutral position. Therefore, according to the present embodiment, the search coils 24 and 25 are provided as the rotor displacement amount detecting sensor 23.

Referring to FIG. 1, the controller 2 will be explained in detail. First, the processing of control over the motor 1 by the controller 2 will be outlined. The controller 2 is composed of an electronic circuit unit which includes a microcomputer and the like. The controller 2 in the present embodiment controls the energizing current (phase current) of the armature windings 6 and 7 of the individual phases of the stators 4 and 5 of the motor 1 by the so-called d-q vector control. More specifically, the controller 2 combines the armature windings 6u, 6v, and 6w for the three phases of the stator 4 and the armature windings 7u, 7v, and 7w for the three phases of the stator 5 to convert them into an equivalent circuit on a two-phase DC d-q coordinate system. The equivalent circuit has an armature winding on a d-axis (hereinafter referred to as "the d-axis armature winding) and the armature winding on a q-axis (hereinafter referred to as "the q-axis armature winding"). Further, in the d-q vector control, the current to be supplied to the armature windings 6 and 7 is handled as the resultant current of the d-axis current as the current to be supplied to the d-axis armature winding and the q-axis current as the current to be supplied to the q-axis armature winding. The d-q coordinate system is a rotary coordinate system which rotates integrally with the rotor 3 of the motor 1, the direction of the field produced by the primary permanent magnets 8 and the auxiliary permanent magnets 10 and 12 of the rotor 3 being taken on the d-axis and the direction orthogonal to the d-axis being taken on the q-axis.

Further, the controller 2 controls the current of each phase of the armature windings 6 and 7 of the stators 4 and 5 of the motor 1 such that the torque of a torque command value Tr_c supplied from an outer source as a target value of an output torque of the motor 1 is output from the output shaft 1a of the motor 1. In this case, in the motor 1 of the present embodiment, the armature windings 6 and 7 are connected in series for each phase, so that the phase current of the armature windings 6 and 7 for each phase will be always the same.

Further, the controller 2 adjusts the d-axial current on the basis of an output of the rotor displacement amount detecting sensor 23 (the output voltages of the search coils 24 and 25), thereby restraining a thrust force acting on the rotor 3 (a force in the direction of the axial center C of the rotor 3).

Figure 6:
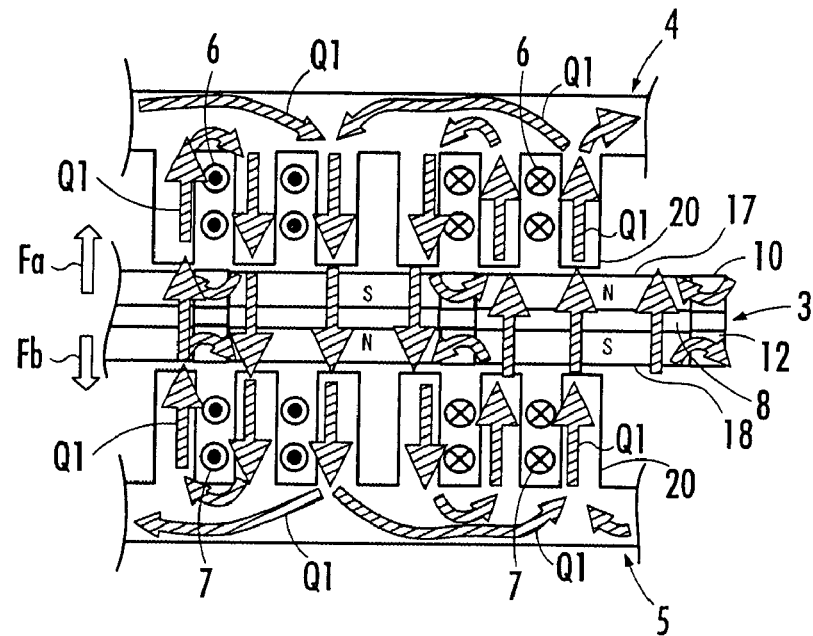
FIGS. 6(a) and 6(b) are views for explaining the principle of restraining a thrust force in the first embodiment.
Figure 6:
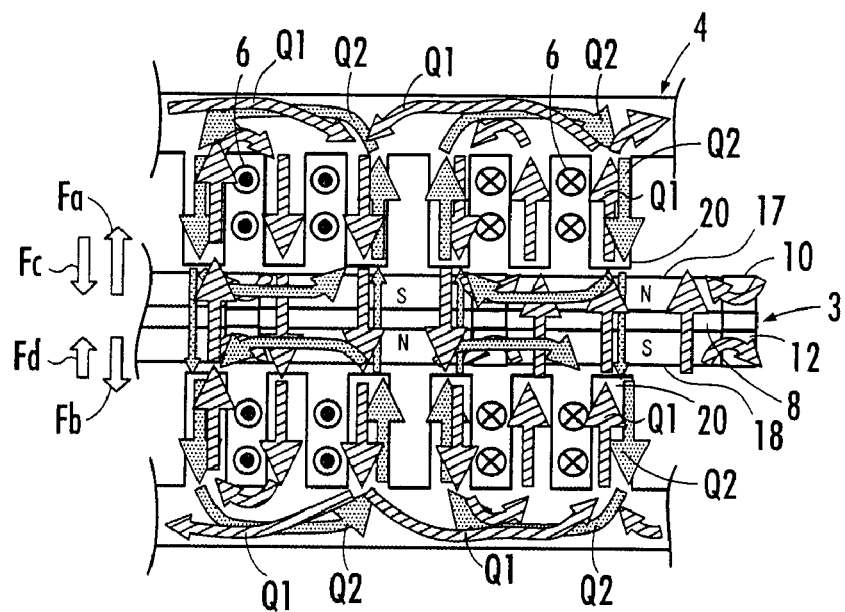

Here, the principle for restraining the thrust force acting on the rotor 3 by adjusting the d-axis current will be described with reference to FIGS. 6(a) and 6(b). In the following explanation, the magnetic fluxes generated by the armature windings 6 and 7 due to the current passing through the armature windings 6 and 7 will be referred to as the current magnetic fluxes. FIG. 6(*a*) illustrates, by hatched arrows, magnet magnetic fluxes Q1 in a state where no current is being supplied to the armature windings 6 and 7 of the stators 4 and 5. FIG. 6(*b*) illustrates the magnet magnetic fluxes Q1 and current magnetic fluxes Q2, which are indicated by the hatched arrows and stippled arrows, respectively, in a state wherein only the d-axis current (more specifically, the d-axis current in the field weakening direction) is being supplied to the armature windings 6 and 7 of the stators 4 and 5. In these FIGS. 6(*a*) and 6(*b*), the rotor 3 and the stators 4 and 5 are partly developed and illustrated, the circumferential direction of the rotor 3 being defined as the lateral direction.

As shown in FIG. 6(*a*), the magnet magnetic fluxes Q1 form closed loops between the two stators 4 and 5 and penetrate the rotor 3 in the axial direction thereof (the thrust direction). At this time, since the stators 4 and 5 are composed of a magnetic material, attraction forces Fa and Fb act between the rotor 3 and the stators 4, 5, and the resultant force thereof provides the thrust force acting on the rotor 3. In FIG. 6(*a*), the attraction forces Fa and Fb are indicated as the forces acting on the rotor 3.

In this case, in the motor 1 of the present embodiment, if the position of the rotor 3 in the axial direction is the neutral position, then the magnitudes of the attraction forces Fa and Fb between the rotor 3 and the stators 4, 5 are substantially the same. Hence, the resultant force of the attraction forces Fa and Fb, i.e., the thrust force acting on the rotor 3 due to the magnet magnetic fluxes Q1 will be substantially zero. Meanwhile, if the position of the rotor 3 in the axial direction is dislocated from the neutral position, then one of the attraction forces Fa and Fb will be larger than the other. This causes a thrust force attributable to the magnet magnetic fluxes Q1 to act on the rotor 3. To be more specific, if the position of the rotor 3 is dislocated toward the stator 4 from the neutral position, then Fa will be larger than Fb (Fa>Fb). At this time, a thrust force equivalent to the difference between Fa and Fb acts on the rotor 3 in the direction from the stator 5 toward the stator 4. If the position of the rotor 3 is dislocated toward the stator 5 from the neutral position, then Fa will be smaller than Fb (Fa<Fb). At this time, a thrust force equivalent to the difference between Fa and Fb acts on the rotor 3 in the direction from the stator 4 toward the stator 5. Especially, in the present embodiment, the rotor 3 has the Halbach array as its magnetic pole configuration, so that the magnetic flux density of the magnet magnetic fluxes Q1 is relatively high. For this reason, the thrust force acting on the rotor 3 when the rotor 3 is displaced from the neutral position tends to be large. Consequently, the thrust force will also act on the bearing that supports the output shaft 1*a* attached to the rotor 3 onto the housing of the motor 1. The thrust force may lead to accelerated deterioration of or damage to the bearing. According to the present embodiment, therefore, the d-axis current is adjusted to restrain the thrust force.

The d-axis current means the field current in the current supplied to the armature windings 6 and 7. The d-axis current has a function for generating, from the armature windings 6 and 7, the current magnetic fluxes Q2 for weakening or strengthening the magnet magnetic fluxes Q1. Supplying the d-axis current for weakening the magnet magnetic fluxes Q1, i.e., the field current in the field weakening direction, to the armature windings 6 and 7 causes the current magnetic fluxes Q2 to be generated from the armature windings 6 and 7, as shown in FIG. 6(*b*). At this time, the current magnetic fluxes Q2 will be the magnetic fluxes in the opposite direction from the magnet magnetic fluxes Q1 at both sides of the rotor 3 in the axial direction. Thus, the current magnetic fluxes Q2 cause repulsive forces Fc and Fd to act between the rotor 3 and the stators 4, 5. In FIG. 6(*b*), the repulsive forces Fc and Fd are indicated as the forces acting on the rotor 3.

In this case, in the motor 1 of the present embodiment, when the rotor 3 is in the neutral position, the magnitudes of the repulsive forces Fc and Fd between the rotor 3 and the stators 4, 5 due to the current magnetic fluxes Q2 are substantially equal. Therefore, the resultant force of the repulsive forces Fc and Fd (the thrust force attributable to the current magnetic fluxes Q2) will be substantially zero. Consequently, the resultant force of the attraction forces Fa and Fb attributable to the magnet magnetic fluxes Q1 will be also substantially zero. In this case, therefore, a thrust force will not virtually act on the rotor 3. Meanwhile, if the position of the rotor 3 is displaced in the axial direction of the rotor 3 from the neutral position, then one of the repulsive forces Fc and Fd will be larger than the other. This causes a thrust force attributable to the current magnetic fluxes Q2 to act on the rotor 3. To be more specific, if the position of the rotor 3 is dislocated from the neutral position toward the stator 4, then Fc will be larger than Fd (Fc>Fd). At this time, a thrust force equivalent to the difference between Fc and Fd (a thrust force attributable to the current magnetic fluxes Q2) will act on the rotor 3 in the direction from the stator 4 toward the stator 5. Further, if the position of the rotor 3 is dislocated from the neutral position toward the stator 5, then Fc will be smaller than Fd (Fc<Fd). At this time, a thrust force equivalent to the difference between Fc and Fd (a thrust force attributable to the current magnetic fluxes Q2) will act on the rotor 3 in the direction from the stator 5 toward the stator 4. In this case, a thrust force due to the current magnetic fluxes Q2 (the resultant force of Fc and Fd) will be in the opposite direction from that of the thrust force attributable to the magnet magnetic fluxes Q1 (the resultant force of Fa and Fb). Hence, if the position of the rotor 3 is displaced in the axial direction from the neutral position, the thrust force (the resultant force of the repulsive forces Fc and Fd) acting on the rotor 3 due to the current magnetic fluxes Q2 generated by the d-axis current (the d-axis current in the field weakening direction) will function as a thrust force that cancels the thrust force (the resultant force of the attraction forces Fa and Fb) acting on the rotor 3 due to the magnet magnetic fluxes Q1. Thus, adjusting the d-axis current makes it possible to restrain a total thrust force acting on the rotor 3.

Supplementally, the q-axis current means a torque current of the current supplied to the armature windings 6 and 7. The current magnetic fluxes generated when the q-axis current is supplied to the armature windings 6 and 7 function to supply a rotational force to the rotor 3 by the interaction with the magnet magnetic fluxes Q1.

Further, in the motor 1 of the present embodiment which is constructed such that the phase currents of the armature windings 6 and 7 are the same for each phase, if the direction of the d-axis current supplied to the armature windings 6 and 7 is reversed from that illustrated in FIG. 6(*b*), then the current magnetic fluxes generated by the d-axis current (i.e., the d-axis current in the field strengthening direction) will be magnetic fluxes having the same direction as that of the magnet magnetic fluxes Q1 on both the stator 4 side and the stator 5 side. Hence, in the motor 1 of the present embodiment, to restrain the thrust force acting on the rotor 3 when the position of the rotor 3 has been dislocated from the neutral position, it is necessary to adjust the d-axis current to be supplied to the armature windings 6 and 7 in the direction for weakening the magnet magnetic fluxes Q1, i.e., in the field weakening direction.

In the following explanation, the d-axis current in the field weakening direction will take a negative value, while the d-axis current in the field strengthening direction will take a positive value.

In the present embodiment, to control the motor 1 as explained above, the controller 2 has, as its functional elements, a current command determiner 41 which determines ad-axis current command value Id_c, which is a basic command value of the d-axis current (the field current) of the armature windings 6 and 7, and a q-axis current command value Iq_c, which is a basic command value of the q-axis current (the torque current), a rotor displacement amount estimator 42 which estimates a rotor displacement amount Δs, which is the amount of displacement of the position of the rotor 3 from the neutral position, on the basis of an output of the rotor displacement amount detecting sensor 23 (an output voltages of the search coils 24 and 25), a d-axis current manipulated variable determiner 43 which determines a d-axis current manipulated variable ΔId_sf for correcting the d-axis current command value Iq_c on the basis of an estimated value of the rotor displacement amount Δs, an arithmetic unit 44 which determines a corrected d-axis current command value Id_ca obtained by correcting the d-axis current command value Id_c on the basis of the d-axis current manipulated variable ΔId_sf, a current controller 45 which controls each phase current of the armature windings 6 and 7 on the basis of the corrected d-axis current command value Id_ca and the q-axis current command value Iq_c, and a rotor velocity calculator 46 which calculates (detects) a rotational angular velocity ωm_s of the rotor 3 by differentiating a rotational angle θm_s of the rotor 3 (hereinafter referred to as the rotor angle detection value θm_s) detected by the resolver 22. The d-axis current manipulated variable determiner 43 and the arithmetic unit 44 function as the field current control means in the present invention. In the present embodiment, the rotational angular velocity ωm_s calculated by the rotor velocity calculator 46 is the angular velocity of the mechanical angle of the rotor 3. However, the rotational angular velocity may be multiplied by the number of pairs of poles of the rotor 3 to convert it into the angular velocity of an electrical angle of the rotor 3.

The processing by the aforesaid functional elements of the controller 2 described above is carried out in succession as explained below at a predetermined control processing cycle.

The rotor displacement amount estimator 42 sequentially receives outputs (output voltages of the search coils 24 and 25) of the rotor displacement amount detecting sensor 23. At this time, the rotor displacement amount estimator 42 determines the estimated value of the rotor displacement amount Δs on the basis of a preset data table from the difference between the received output voltages of the search coils 24 and 25. In the present embodiment, the value of the rotor displacement amount Δs when the position of the rotor 3 is displaced from the neutral position toward one of the stators 4 and 5, e.g., toward the stator 4, is a positive value, while the value of the rotor displacement amount Δs when the rotor 3 is displaced toward the stator 5 is a negative value.

The estimated values of the rotor displacement amount Δs determined as described above are input to the d-axis current manipulated variable determiner 43 in succession. At this time, the d-axis current manipulated variable determiner 43 determines the d-axis current manipulated variable ΔId_sf by a feedback control law from the input estimated value of the rotor displacement amount Δs such that the rotor displacement amount Δs is approximated to zero. In the present embodiment, a PI control law (a proportional-integral control law), for example, is used as the feedback control law. In this case, according to the present embodiment, the d-axis current manipulated variable ΔId_sf is obtained by multiplying, by (−1), the absolute value of the value determined by the PI control law (the sum of the proportional term and the integral term of the PI control law) from the estimated value of the rotor displacement amount Δs. In other words, if the value determined by the PI control law from the estimated value of the rotor displacement amount Δs is denoted by FB, then ΔId_sf=−|FB| holds. Therefore, ΔId_sf is a negative value or zero. Incidentally, the magnitude (the absolute value) of ΔId_sf is limited to a predetermined upper limit value or less. The d-axis current manipulated variable ΔId_sf determined as described above functions as a manipulated variable for adjusting the d-axis current of the armature windings 6 and 7 in the field weakening direction except for the case where the value thereof is zero (the case where Δs=0).

In parallel to the processing by the rotor displacement amount estimator 42 and the d-axis current manipulated variable determiner 43 described above, the current command determiner 41 sequentially receives the torque command value Tr_c and the rotational angular velocity ωm_s of the rotor 3 (hereinafter referred to as the rotor rotational velocity ωm_s) calculated by the rotor velocity calculator 46. Then, the current command determiner 41 determines the d-axis current command value Id_c and the q-axis current command value Iq_c from the above input values according to a map established beforehand. More specifically, Id_c and Iq_c are feedforward command values determined on the basis of the torque command value Tr_c and the rotor rotational velocity ωm_s. In this case, basically, the q-axis current command value Iq_c is determined to a value that is proportional to the torque command value Tr_c. The d-axis current command value Id_c is determined such that the magnitude of the resultant vector of the voltage of the d-axis armature winding (hereinafter referred to as the d-axis voltage) and the voltage of the q-axis armature winding (hereinafter referred to as the q-axis voltage) calculated from the q-axis current command value Iq_c, the d-axis current command value Id_c, and the rotor rotational velocity ωm_s does not exceed a predetermined value determined on the basis of the supply voltage of the motor 1. The d-axis current command value Id_c is basically the command value determined to supply the field current component in the field weakening direction (the d-axis current component of a negative value) to the armature windings 6 and 7 in the operation range of the motor 1 in which the rotor rotational velocity ωm_s becomes high.

The d-axis current command value Id_c determined by the current command determiner 41 as described above and the d-axis current manipulated variable ΔId_sf determined by the d-axis manipulated variable determiner 43 are input to the arithmetic unit 44. Then, the arithmetic unit 44 adds ΔId_sf to Id_c to determine the corrected d-axis current command value Id_ca. In this case, ΔId_sf<0 holds except for the case where ΔId_sf=0. Hence, the corrected d-axis current command value Id_ca turns into the d-axis current command value obtained by adding a field current component in the field weakening direction by ΔId_sf to Id_c. Accordingly, the d-axis current manipulated variable ΔId_sf corresponds to the field current component in the present invention.

The corrected d-axis current command value Id_ca, the q-axis current command value Iq_c determined by the current command determiner 41, and the rotor angle detection value θm_s detected by the resolver 22 are sequentially input to the current controller 45. The rotor rotational velocity ωm_s is also sequentially input to the current controller 45.

The current controller 45 is equipped with current sensors 47 and 48 which are the current detecting devices for detecting the phase currents of two phases, e.g., the U-phase and the W-phase, among the phase currents of the phases of the armature windings 6 and 7, respectively, and a dq converter 50 which calculates the d-axis current detection value Id_s and the q-axis current detection value Iq_s as the detection values (estimated values) of the d-axis current and the q-axis current, respectively, from the current detection value Iu_s of the armature windings 6u and 7u of the U-phase and the current detection value Iw_s of the armature windings 6w and 7w of the W-phase obtained by passing the outputs of the current sensors 47 and 38 through a BP filter 49. The BP filter 49 is a filter having a band-pass characteristic for removing noise components from the outputs of the current sensors 47 and 48.

The dq converter 50 calculates the d-axis current detection value Id_s and the q-axis current detection value Iq_s by coordinate-converting, according to an electrical angle of the rotor 3, the current detection value Iu_s of the armature windings 6u and 7u of the U-phase, the current detection value Iw_s of the armature windings 6w and 7w of the W-phase, and the current detection value Iv_s (=−Iu_s−Iw_s) of the armature windings 6v and 7v of the V-phase calculated from the current detection value Iu_s and the current detection value Iw_s. In this case, the electrical angle of the rotor 3 is determined by multiplying the rotor angle detection value θm_s by the number of pairs of poles of the rotor 3.

The current controller 45 further includes an arithmetic unit 51 which determines a difference ΔId (=Id_ca−Id_s) between the corrected d-axis current command value Id_ca and the d-axis current detection value Id_s, an arithmetic unit 52 which determines a difference ΔIq (=Iq_c−Iq_s) between the q-axis current command value Iq_c and the q-axis current detection value Iq_s, PI controllers 53 and 54 which calculate a basic command value of the d-axis voltage Vd1_c and a basic command value of the q-axis voltage Vq1_c, respectively, by the PI control law (the proportional-integral control law) as the feedback control law from the differences ΔId and ΔIq such that the differences ΔId and ΔIq approximate zero, and a non-interacting controller 55 which determines a correction amount Vd2_c of the d-axis voltage and a correction amount Vq2_c of the q-axis voltage to cancel a motional electromotive force which causes mutual interference between the d-axis and the q-axis. The non-interacting controller 55 calculates the correction amount Vd2_c of the d-axis side from the q-axis current command value Iq_c and the rotor rotational velocity ωm_s. Further, the non-interacting controller 55 calculates the correction amount Vq2_c on the q-axis side from the corrected d-axis current command value Id_ca and the rotor rotational velocity ωm_s.

The current controller 45 further includes an arithmetic unit 56 which determines a final d-axis voltage command value Vd_c by adding the correction amount Vd2_c to the basic command value Vd1_c of the d-axis voltage, an arithmetic unit 57 which determines a final q-axis voltage command value Vq_c by adding the correction amount Vq2_c to the basic command value Vq1_c of the q-axis voltage, a three-phase converter 58 which determines phase voltage command values Vu_c, Vv_c, and Vw_c of the armature windings 6u and 7u of the U-phase, the armature windings 6v and 7v of the V-phase, and the armature windings 6w and 7w of the W-phase, respectively, from the d-axis voltage command value Vd_c and the q-axis voltage command value Vq_c, and a power drive unit 59 (hereinafter referred to as the "PDU 59") which energizes the armature windings 6 and 7 for each phase on the basis of the phase voltage command values Vu_c, Vv_c, and Vw_c.

In this case, the three-phase converter 58 subjects the d-axis voltage command value Vd_c and the q-axis voltage command value Vq_c to coordinate conversion on the basis of the electrical angle of the rotor 3 so as to calculate the phase voltage command values Vu_c, Vv_c, and Vw_c. The PDU 59, the circuit configuration of which is not shown, is equipped with a publicly known inverter circuit which has switching elements for three phases which are connected to a capacitor serving as a power source of the motor 1. The PDU 59 controls the turning on/off of the switching elements of the individual phases of the inverter circuit by PWM control on the basis of the phase voltage command values Vu_c, Vv_c, and Vw_c, thereby controlling the supply of current between the armature windings 6, 7 and the capacitor for each phase.

By the control processing carried out by the functional sections of the current controller 45 explained above, the current of each phase of the armature windings 6 and 7 is controlled such that it agrees with the command value of each phase current of the armature windings 6 and 7 corresponding to the corrected d-axis current command value Id_ca and the q-axis current command value Iq_c (the command value of each phase current obtained by coordinate-converting the set of Id_ca and Iq_c into three-phase on the basis of the electrical angle of the rotor 3. In other words, the control is carried out such that the actual d-axis current and q-axis current of the armature windings 6 and 7 agree with Id_ca and Iq_c, respectively. Consequently, the operation of the motor 1 is controlled such that a torque of the torque command value Tr_c is generated at the output shaft 1a of the motor 1.

In this case, the corrected d-axis current command value Id_ca is obtained by adding the d-axis current manipulated variable ΔId_sf as the feedback manipulated variable, which is determined such that the rotor displacement amount Δs is approximated to zero, to the d-axis current command value Id_c, which is the basic command value (a feedforward command value) of the d-axis current determined by the current command determiner 41. The d-axis current manipulated variable ΔId_sf takes a negative value (a field current component in the field weakening direction) when the position of the rotor 3 is dislocated from the neutral position toward either the stator 4 or 5, that is, when a thrust force attributable to magnet magnetic fluxes acts on the rotor. Hence, the actual d-axis current of the armature windings 6 and 7 will be the current obtained by adding the d-axis current manipulated variable ΔId_sf as the field current component in the field weakening direction to the d-axis current command value Id_c.

At this time, the current magnetic fluxes generated due to the added field current component (the d-axis current manipulated variable ΔId_sf) in the field weakening direction cause a thrust force in the direction for canceling the thrust force acting on the rotor 3 due to the magnet magnetic fluxes to act on the rotor 3, as described above with reference to FIG. 6(b). This will make an adjustment so that the total thrust force acting on the rotor 3 approximates zero. As a result, it is possible to reduce the thrust force which acts on the bearing, which supports the output shaft 1a of the motor 1 on the housing, in the axial direction of the rotor 3. This makes it possible to restrain damage to or early deterioration of the bearing. Moreover, since thrust forces can be reduced, the required rigidity of the constituent parts, such as the bearing, of the motor 1 can be reduced. As a result, the cost of the parts of the motor 1 can be reduced and the size of the motor 1 can be also reduced.

Second Embodiment

A second embodiment of the present invention will now be described with reference to FIG. 7. In the description of the present embodiment, the same constituent elements as those of the first embodiment will be assigned the same reference numerals as those of the first embodiment, and detailed explanation thereof will be omitted. The present embodiment is an embodiment of the fifth aspect of the present invention described above.

Figure 7:
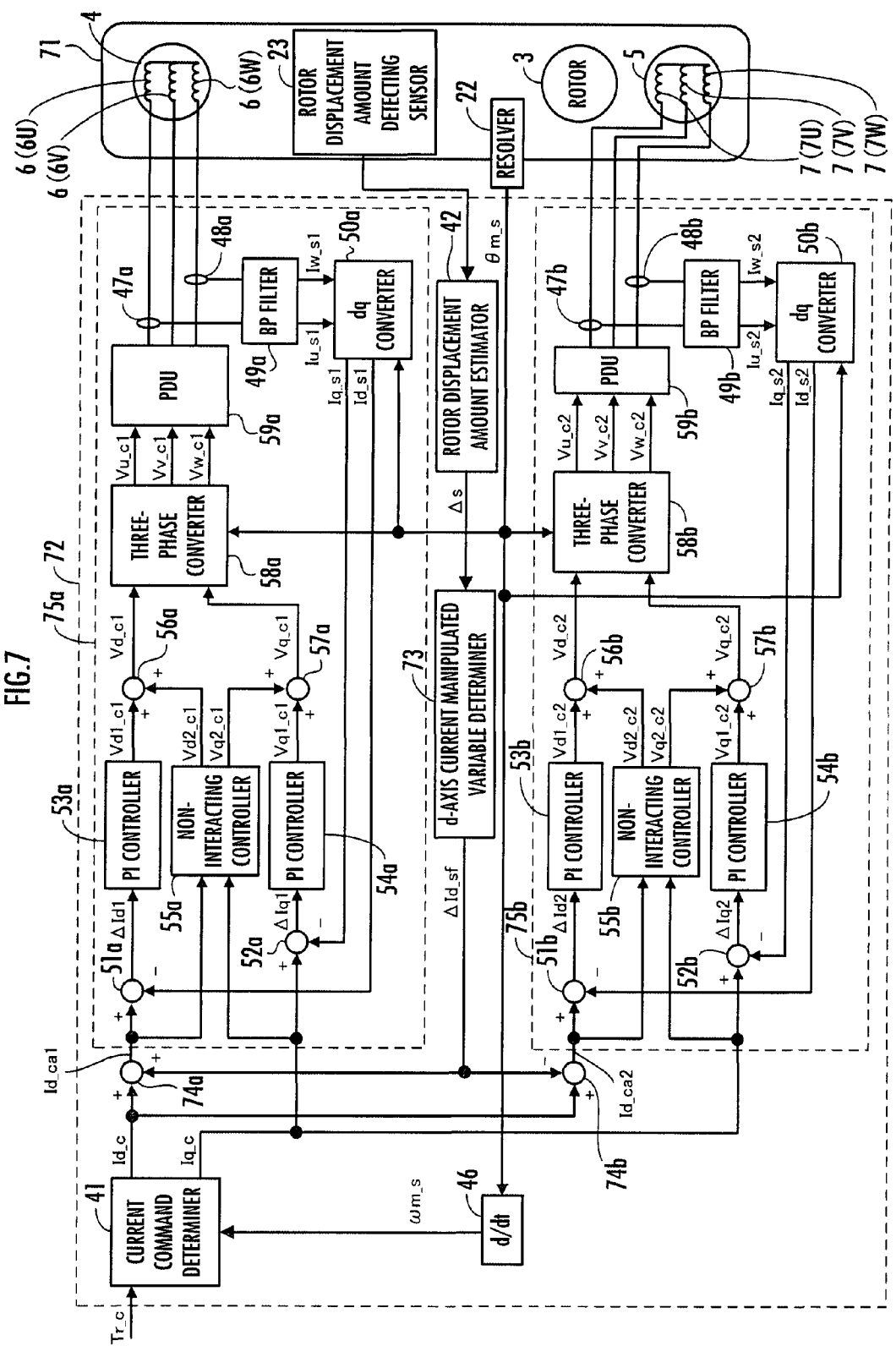
FIG. 7 is a block diagram illustrating the general construction of a motor controller in a second embodiment of the present invention.

Referring to FIG. 7, reference numeral 71 denotes a motor, and reference numeral 72 denotes a controller which controls the operation of the motor 71.

The motor 71 in the present embodiment shares the same basic construction as that of the motor 1 of the first embodiment, and has a rotor 3 and stators 4 and 5 of the same structures as those of the motor 1. The stators 4 and 5 have armature windings 6 and 7, respectively, for three phases attached thereon in the same manner as that for the motor 1. However, the motor 71 in the present embodiment differs from the motor 1 in that the armature windings 6 and 7 are not interconnected.

In other words, in the present embodiment, armature windings 6u, 6v, and 6w of the individual phases of the stator 4 have their ends on one side interconnected to form a neutral point, while the ends on the other side are connected to a power driver unit 59a, which will be discussed later, of the controller 72. Similarly, armature windings 7u, 7v, and 7w of the individual phases of the stator 5 have their ends on one side interconnected to form a neutral point, while the ends on the other side are connected to a power driver unit 59b, which will be discussed later, of the controller 72. The present embodiment, therefore, allows the current of the armature windings 6 of the stator 4 and the current of the armature windings 7 of the stator 5 to be separately controlled.

The motor 71 is provided with a rotor displacement amount detecting sensor 23 (search coils 24 and 25), which is the same as that of the motor 1, and a resolver 22.

As with the controller 2 of the first embodiment, the controller 72 is constructed of an electronic circuit unit, including a microcomputer. In the present embodiment also, the energizing current (phase current) of the armature windings 6 and 7 of each phase of the stators 4 and 5 of the motor 71 is controlled by carrying out the d-q vector control. However, in the d-q vector control in the present embodiment, the controller 72 handles the armature windings 6u, 6v, and 6w for the three phases of the stator 4 and the armature windings 7u, 7v, and 7w for the three phases of the stator 5 separately by converting them into equivalent circuits on a two-phase DC d-q coordinate system. Further, the controller 72 separately controls each phase current of the armature windings 6 of the stator 4 of the motor 1 and each phase current of the armature windings 7 of the stator 5 such that the torque of the torque command value Tr_c supplied from an outer source as the target value of an output torque of the motor 1 is output from the output shaft 1a of the motor 1.

Further, the controller 72 adjusts the d-axis current of the armature windings 6 of the stator 4 and the d-axis current of the armature windings 7 of the stator 5 on the basis of an output of the rotor displacement amount detecting sensor 23 (the output voltages of the search coils 24 and 25), thereby restraining a thrust force acting on the rotor 3. In this case, according to the present embodiment, to restrain the thrust force acting on the rotor 3, the d-axis current of one of the armature windings 6 and 7 is adjusted in the field weakening direction, while the d-axis current of the other is adjusted in the field strengthening direction.

In the present embodiment, to carry out the control of the motor 71 explained above, the controller 72 is equipped with a current command determiner 41, a rotor displacement amount estimator 42, and a rotor velocity calculator 46, as the same functional elements as those of the controller 2 in the first embodiment.

The controller 72 is equipped with, as functional elements that are different from those of the controller 2 in the first embodiment, a d-axis current manipulated variable determiner 73 which determines a d-axis current manipulated variable $\Delta Id\_sf$ for correcting the d-axis current command value Iq_c on the basis of an estimated value of the rotor displacement amount $\Delta s$ determined by the rotor displacement amount estimator 42, arithmetic units 74a and 74b which determine a first corrected d-axis current command value Id_ca1 and a second corrected d-axis current command value Id_ca2, respectively, obtained by correcting the d-axis current command value Id_c by the d-axis current manipulated variable $\Delta Id\_sf$, a current controller 75a which controls each phase current of the armature windings 6 of the stator 4 on the basis of the first corrected d-axis current command value Id_ca1 and the q-axis current command value Iq_c, and a current controller 75b which controls each phase current of the armature windings 7 of the stator 5 on the basis of the second corrected d-axis current command value Id_ca2 and the q-axis current command value Iq_c.

The processing of each of the functional elements of the controller 72 described above is sequentially implemented at a predetermined control processing cycle, as described below.

The estimated value of the rotor displacement amount $\Delta s$ determined in the same manner as that in the first embodiment by the rotor displacement amount estimator 42 is sequentially input to the d-axis current manipulated variable determiner 73. At this time, the d-axis current manipulated variable determiner 73 determines the d-axis current manipulated variable $\Delta Id\_sf$ from the rotor displacement amount $\Delta s$ by the PI control law as a feedback control law such that $\Delta s$ is approximated (converged) to zero. In this case, according to the present embodiment, the d-axis current manipulated variable determiner 73 outputs the value determined by the PI control law as it is as the d-axis current manipulated variable $\Delta Id\_sf$. Thus, according to the present embodiment, the d-axis current manipulated variable $\Delta Id\_sf$ calculated by the d-axis current manipulated variable determiner 73 may take a positive value or a negative value. Further, according to the present embodiment, the gain of the proportional term and the gain of the integral term in the PI control law are set such that if the rotor displacement amount $\Delta s$ takes a positive value, that is, if the position of the rotor 3 has been dislocated from the neutral position toward the stator 4, then $\Delta Id\_sf$ takes a negative value, while if the rotor displacement amount $\Delta s$ takes a negative value, that is, if the position of the rotor 3 has been dislocated from the neutral position toward the stator 5, then $\Delta Id\_sf$ takes a positive value. Incidentally, the magnitude (the absolute value) of the d-axis current manipulated variable $\Delta Id\_sf$ is limited to a predetermined upper limit value or less.

Meanwhile, in parallel to the processing by the rotor displacement amount estimator 42 and the d-axis current manipulated variable determiner 73, the processing by the current command determiner 41 is carried out. At this time, as with the first embodiment, the d-axis current command value Id_c as the basic command value (a feedforward command value) of the d-axis current and the q-axis current command value Iq_c as the basic command value (a feedforward command value) of the q-axis current are sequentially determined from the torque command value Tr_c and the rotor rotational velocity ωm_s. In the present embodiment, the d-axis current command value Id_c and the q-axis current command value Iq_c determined by the current command determiner 41 are basic command values common to both armature windings 6 and 7.

Then, the d-axis current command value Id_c determined by the current command determiner 41 and the d-axis current manipulated variable ΔId_sf determined by the d-axis current manipulated variable determiner 73 are input to the arithmetic units 74a and 74b. At this time, the arithmetic unit 74a adds ΔId_sf to Id_c to determine the first corrected d-axis current command value Id_ca1 as the d-axis current command value related to the armature windings 6 of the stator 4. Reversely from the arithmetic unit 74a, the arithmetic unit 74b subtracts ΔId_sf from Id_c to determine the second corrected d-axis current command value Id_ca2 as the d-axis current command value related to the armature windings 7 of the stator 5.

In this case, if the d-axis current manipulated variable ΔId_sf takes a negative value (if the position of the rotor 3 has been displaced from the neutral position toward the stator 4), then the first corrected d-axis current command value Id_ca1 related to the armature windings 6 takes a d-axis current command value obtained by adding a field current component in the field weakening direction by the magnitude equivalent to ΔId_sf to the d-axis current command value Id_c. At the same time, the second corrected d-axis current command value Id_ca2 related to the armature windings 7 takes a d-axis current command value obtained by adding a field current component in the field strengthening direction by the magnitude equivalent to ΔId_sf to the d-axis current command value Id_c.

Further, if the d-axis current manipulated variable ΔId_sf takes a positive value (if the position of the rotor 3 has displaced from the neutral position toward the stator 5), then the first corrected d-axis current command value Id_ca1 related to the armature windings 6 will be the d-axis current command value obtained by adding the field current component in the field strengthening direction by the magnitude equivalent to ΔId_sf to the d-axis current command value Id_c. At the same time, the second corrected d-axis current command value Id_ca2 related to the armature windings 7 will be the d-axis current command value obtained by adding the field current component in the field weakening direction by the magnitude equivalent to ΔId_sf to the d-axis current command value Id_c.

The first corrected d-axis current command value Id_ca1 determined by the arithmetic unit 74a as described above, the q-axis current command value Iq_c determined by the current command determiner 41, and the rotor angle detection value θm_s detected by the resolver 22 are sequentially input to the current controller 75a. Similarly, the second corrected d-axis current command value Id_ca2 determined by the arithmetic unit 74b, the q-axis current command value Iq_c, and the rotor angle detection value θm_s detected by the resolver 22 are sequentially input to the current controller 75b. The current controllers 75a and 75b also sequentially receive the rotor rotational velocity ωm_s.

Further, these current controllers 75a and 75b carry out the same processing as that by the current controller 45 in the first embodiment to control each phase current of the armature windings 6 of the stator 4 and each phase current of the armature windings 7 of the stator 5, respectively.

More specifically, the current controller 75a associated with the armature windings 6 of the stator 4 is provided with current sensors 47a and 48a, which are current detectors for detecting the phase current of each of the two phases (the U-phase and the W-phase in the present embodiment) of the armature windings 6 of the stator 4, a BP filter (a band-pass filter) 49a, and a dq converter 50a. As with the current controller 45 in the first embodiment, the current controller 75a coordinate-converts a current detection value Iu_s1 of the armature winding 6u of the U-phase and a current detection value Iw_s1 of the armature winding 6w of the W-phase obtained by passing the outputs of the current sensors 47a and 48a through the BP filter 49a, and a current detection value Iv_s1 of the armature winding 6v of the V phase calculated from the current detection values Iu_s1 and Iw_s1 on the basis of the electrical angle of the rotor 3 (θm_s×the number of the pairs of poles of the rotor 3) in the dq converter 50a. Thus, the d-axis current detection value Id_s1 and the q-axis current detection value Iq_s1 of the armature windings 6 of the stator 4 are calculated.

Further, as with the current controller 45 in the first embodiment, the current controller 75a further includes an arithmetic unit 51a which determines a difference ΔId1 (=Id_ca1−Id_s1) between the first corrected d-axis current command value Id_ca1 and the d-axis current detection value Id_s1, an arithmetic unit 52a which determines a difference ΔIq1 (=Iq_c−Iq_s1) between the q-axis current command value Iq_c and the q-axis current detection value Iq_s1, PI controllers 53a and 54a which calculate a basic command value of the d-axis voltage Vd1_c1 and a basic command value of the q-axis voltage Vq1_c1, respectively, of the armature windings 6 of the stator 4 by the PI control law (the proportional-integral control law) as the feedback control law from the differences ΔId1 and ΔIq1 such that the differences ΔId1 and ΔIq1 approximate zero, and a non-interacting controller 55a which determines a correction amount Vd2_c1 of the d-axis voltage and a correction amount Vq2_c1 of the q-axis voltage to cancel a motional electromotive force which causes mutual interference between the d-axis and the q-axis. The non-interacting controller 55a calculates the correction amount Vd2_c1 on the d-axis side from the q-axis current command value Iq_c and the rotor rotational velocity ωm_s. Further, the non-interacting controller 55a calculates the correction amount Vq2_c1 on the q-axis side from the first corrected d-axis current command value Id_ca1 and the rotor rotational velocity ωm_s.

As with the current controller 45 in the first embodiment, the current controller 75a further includes an arithmetic unit 56a which determines a final d-axis voltage command value Vd_c1 by adding the correction amount Vd2_c1 to the basic command value Vd1_c1 of the d-axis voltage, an arithmetic unit 57a which determines a final q-axis voltage command value Vq_c1 by adding the correction amount Vq2_c1 to the basic command value Vq1_c1 of the q-axis voltage, a three-phase converter 58a which determines phase voltage command values Vu_c1, Vv_c1, and Vw_c1 of the U-phase, the V-phase, and the W-phase, respectively, of the armature windings 6 from the d-axis voltage command value Vd_c1 and the q-axis voltage command value Vq_c1, and the power drive unit 59a (hereinafter referred to as the "PDU 59a") which energizes the armature windings 6u, 6v, and 6w of the individual phases on the basis of these phase voltage command values Vu_c1, Vv_c1, and Vw_c1.

In this case, the three-phase converter 58a subjects the d-axis voltage command value Vd_c1 and the q-axis voltage command value Vq_c1 to coordinate conversion on the basis of the electrical angle of the rotor 3 so as to calculate the phase voltage command values Vu_c1, Vv_c1, and Vw_c1. As with the PDU 59 in the first embodiment, the PDU 59a is equipped with an inverter circuit (not shown). The PDU 59a controls the turning on/off of the switching elements of each phase of the inverter circuit by PWM control on the basis of the phase voltage command values Vu_c1, Vv_c1, and Vw_c1, thereby controlling the supply of current between the armature windings 6u, 6v, 6w of the individual phases and a capacitor (not shown) serving as the power source of the motor 71.

Further, the current controller 75b associated with the armature windings 7 of the stator 5 is provided with current sensors 47b and 48b, which are current detectors for detecting the phase current of each of the two phases (the U-phase and the W-phase in the present embodiment) of the armature windings 7 of the stator 5, a BP filter (a band-pass filter) 49b, and a dq converter 50b. As with the current controller 45 in the first embodiment, the current controller 75b coordinate-converts a current detection value Iu_s2 of the armature winding 7u of the U-phase and a current detection value Iw_s2 of the armature winding 7w of the W-phase obtained by passing the outputs of the current sensors 47b and 48b through the BP filter 49b, and a current detection value Iv_s2 of the armature winding 7v of the V phase calculated from the current detection values Iu_s2 and Iw_s2 on the basis of the electrical angle of the rotor 3 ($\theta$m_s×the number of the pairs of poles of the rotor 3) in the dq converter 50b. Thus, the d-axis current detection value Id_s2 and the q-axis current detection value Iq_s2 of the armature windings 7 are calculated.

Further, as with the current controller 45 in the first embodiment, the current controller 75b further includes an arithmetic unit 51b which determines a difference $\Delta$Id2 (=Id_ca2−Id_s2) between the second corrected d-axis current command value Id_ca2 and the d-axis current detection value Id_s2, an arithmetic unit 52b which determines a difference $\Delta$Iq2 (=Iq_c−Iq_s2) between the q-axis current command value Iq_c and the q-axis current detection value Iq_s2, PI controllers 53b and 54b which calculate a basic command value of the d-axis voltage Vd1_c2 and a basic command value of the q-axis voltage Vq1_c2, respectively, of the armature windings 7 of the stator 5 by the PI control law (the proportional-integral control law) as the feedback control law from the differences $\Delta$Id2 and $\Delta$Iq2 such that the differences $\Delta$Id2 and $\Delta$Iq2 approximate zero, and a non-interacting controller 55b which determines a correction amount Vd2_c2 of the d-axis voltage and a correction amount Vq2_c2 of the q-axis voltage to cancel a motional electromotive force which causes mutual interference between the d-axis and the q-axis. The non-interacting controller 55b calculates the correction amount Vd2_c2 on the d-axis side from the q-axis current command value Iq_c and the rotor rotational velocity $\omega$m_s. Further, the non-interacting controller 55b calculates the correction amount Vq2_c2 on the q-axis side from the second corrected d-axis current command value Id_ca2 and the rotor rotational velocity $\omega$m_s.

As with the current controller 45 in the first embodiment, the current controller 75b further includes an arithmetic unit 56b which determines a final d-axis voltage command value Vd_c2 by adding the correction amount Vd2_c2 to the basic command value Vd1_c2 of the d-axis voltage, an arithmetic unit 57b which determines a final q-axis voltage command value Vq_c2 by adding the correction amount Vq2_c2 to the basic command value Vq1_c2 of the q-axis voltage, a three-phase converter 58b which determines phase voltage command values Vu_c2, Vv_c2, and Vw_c2 of the U-phase, the V-phase, and the W-phase, respectively, of the armature windings 7 of the stator 5 from the d-axis voltage command value Vd_c2 and the q-axis voltage command value Vq_c2, and a power drive unit 59b (hereinafter referred to as the "PDU 59b") which energizes the armature windings 7u, 7v, and 7w of the individual phases on the basis of these phase voltage command values Vu_c2, Vv_c2, and Vw_c2.

In this case, the three-phase converter 58b subjects the d-axis voltage command value Vd_c2 and the q-axis voltage command value Vq_c2 to coordinate conversion on the basis of the electrical angle of the rotor 3 so as to calculate the phase voltage command values Vu_c2, Vv_c2, and Vw_c2. As with the PDU 59 in the first embodiment, the PDU 59b is equipped with an inverter circuit (not shown). The PDU 59b controls the turning on/off of the switching elements of the individual phases of the inverter circuit by PWM control on the basis of the phase voltage command values Vu_c2, Vv_c2, and Vw_c2, thereby controlling the supply of current between the armature windings 7u, 7v, 7w of the individual phases and a capacitor (not shown) serving as the power source of the motor 71.

The control is implemented by means of the control processing carried out by the functional sections of the current controller 75a described above such that each phase current of the armature windings 6 of the stator 4 agrees with the command value of each phase current of the armature windings 6 associated with the first corrected d-axis current command value Id_ca1 and the q-axis current command value Iq_c (the command value of each phase current obtained by coordinate-converting a set of Id_ca1 and Iq_c into three-phase on the basis of the electrical angle of the rotor 3). Similarly, the control is implemented by the control processing carried out by the functional sections of the current controller 75b such that each phase current of the armature windings 7 of the stator 5 agrees with the command value of each phase current of the armature windings 7 associated with the second corrected d-axis current command value Id_ca2 and the q-axis current command value Iq_c (the command value of each phase current obtained by coordinate-converting a set of Id_ca2 and Iq_c into three-phase on the basis of the electrical angle of the rotor 3). Thus, the operation of the motor 71 is controlled such that a torque of the torque command value Tr_c is generated at an output shaft 1a of the motor 71.

In this case, according to the present embodiment, if the position of the rotor 3 has been dislocated from the neutral position toward the stator 4, that is, if a thrust force acting on the rotor 3 due to magnet magnetic fluxes is a thrust force directed toward the stator 4 from the stator 5, then the first corrected d-axis current command value Id_ca1 as the command value of the d-axis current of the armature windings 6 of the stator 4 is obtained by adding a field current component in the field weakening direction having the magnitude of the d-axis current manipulated variable $\Delta$Id_sf to the d-axis current command value Id_c. The current magnetic fluxes generated at the stator 4 due to the added field current component in the field weakening direction will be in the opposite direction from the magnet magnetic fluxes between the stator 4 and the rotor 3. Hence, the current magnetic fluxes cause a repulsive force directed toward the stator 5 from the stator 4 (a repulsive force in the opposite direction from the thrust force acting on the rotor 3 due to the magnet magnetic fluxes) to act on the rotor 3. At the same time, the first corrected d-axis current command value Id_ca1 as the command value of the d-axis current of the armature windings 7 of the stator 5 is obtained by adding a field current component in the field strengthening direction to the d-axis current command value Id_c by the magnitude of the d-axis current manipulated variable $\Delta$Id_sf. The current magnetic fluxes generated at the stator 5 due to the added field current component in the field strengthening direction will be in the same direction as that of the magnet magnetic fluxes between the stator 5 and the rotor 3. Hence, the current magnetic fluxes cause an attraction force directed toward the stator 5 from the stator 4 (an attraction force in the opposite direction from that of the thrust force acting on the rotor 3 due to the magnet magnetic fluxes) to act on the rotor 3. Thus, the total thrust force acting on the rotor 3 is adjusted to approximate to zero.

Further, if the position of the rotor 3 has been dislocated from the neutral position toward the stator 5, that is, if the thrust force acting on the rotor 3 due to magnet magnetic fluxes is a thrust force directed toward the stator 5 from the stator 4, then the first corrected d-axis current command value Id_ca1 as the command value of the d-axis current of the armature windings 6 of the stator 4 is obtained by adding a field current component in the field strengthening direction by the magnitude of the d-axis current manipulated variable $\Delta$Id_sf to the d-axis current command value Id_c. The current magnetic fluxes generated at the stator 4 due to the added field current component in the field strengthening direction will be in the same direction as that of the magnet magnetic fluxes between the stator 4 and the rotor 3. Hence, the current magnetic fluxes cause an attraction force directed toward the stator 4 from the stator 5 (an attraction force in the opposite direction from that of the thrust force acting on the rotor 3 due to the magnet magnetic fluxes) to act on the rotor 3. At the same time, the second corrected d-axis current command value Id_ca2 as the command value of the d-axis current of the armature windings 7 of the stator 5 is obtained by adding a field current component in the field weakening direction to the d-axis current command value Id_c by the magnitude equivalent to the d-axis current manipulated variable $\Delta$Id_sf. The current magnetic fluxes generated at the stator 5 due to the added field current component in the field weakening direction will be in the opposite direction from that of the magnet magnetic fluxes between the stator 5 and the rotor 3. Hence, the current magnetic fluxes cause a repulsive force directed toward the stator 4 from the stator 5 (a repulsive force in the opposite direction from that of the thrust force acting on the rotor 3 due to the magnet magnetic fluxes) to act on the rotor 3. Thus, the total thrust force acting on the rotor 3 is adjusted to approximate to zero.

As a result, even if the position of the rotor 3 has been dislocated from the neutral position toward the stator 4 or 5, it is possible to reduce a thrust force acting in the axial direction of the rotor 3 on the bearing which supports the output shaft 1a of the motor 71 onto the housing. Furthermore, as with the first embodiment, damage to or early deterioration of the bearing can be restrained. In addition, the cost of the parts of the motor 71 can be reduced and the size of the motor 71 can be also reduced.

The following will describe several modifications of the first and the second embodiments described above.

First Modification

In the aforesaid embodiments, the search coils 24 and 25 have been used to recognize the rotor displacement amount $\Delta$s (in other words, the relative position of the rotor 3 with respect to the two stators 4 and 5). Alternatively, a thrust force actually acting on the rotor 3 may be detected using an appropriate sensor and the d-axis current may be adjusted on the basis of the detected thrust force.

In this case, for example, a thrust force acting on the rotor 3, including the direction of the thrust force, is detected by using a force sensor or a pressure sensor interposed between the bearing, which supports the output shaft 1a of the motor 1 or 71 onto the housing, and the housing, or a strain gauge attached to the housing. Then, by setting the target value of the detection value of the thrust force to zero or a value in the vicinity of zero, the d-axis current manipulated variable $\Delta$Id_sf in the first embodiment or the second embodiment described above may be determined by a feedback control law, such as the PI control law, from the difference between the detection value and the target value of the thrust force.

Second Modification

In the aforesaid second embodiment, in the situation wherein the position of the rotor 3 has been displaced from the neutral position, a thrust force acting on the rotor 3, both the field current component of the armature windings 6 of the stator 4 and the field current component of the armature windings 7 of the stator 5 have been adjusted by the d-axis current manipulated variable $\Delta$Id_sf. Alternatively, however, the field current component of only one of the armature windings 6 and 7 may be adjusted. In this case, one of the arithmetic units 74a and 74b may be omitted, and the d-axis current command value Id_c may be directly input to the current controller 75a or 75b associated with the omitted arithmetic unit 74a or 74b. This arrangement constitutes an embodiment of the third aspect or the fourth aspect of the invention described above.

Third Modification

Alternatively, the d-axis current manipulated variable determiner 73 in the second embodiment may be replaced by the d-axis current manipulated variable determiner 43 in the first embodiment, and a value obtained by subtracting the d-axis current manipulated variable $\Delta$Id_sf determined by the d-axis current manipulated variable determiner 43 from the d-axis current command value Id_c may be used as the first corrected d-axis current command value Id_ca1 and the second corrected d-axis current command value Id_ca2. In this case, the same current will always pass through the armature windings 6 and 7 for each phase, so that the current of the armature windings 6 and 7 will be controlled substantially in the same manner as that in the first embodiment. Consequently, the same advantages as those of the first embodiment will be provided. This arrangement will constitute an embodiment of the aforesaid second aspect of the invention.

Fourth Modification

Further, in the aforesaid embodiments or the aforesaid first to third modifications, the rotor displacement amount detecting sensor 23 has been used to estimate the rotor displacement amount $\Delta$s or detect a thrust force, and the d-axis current manipulated variable $\Delta$Id_sf for restraining the thrust force acting on the rotor 3 on the basis of the estimated displacement amount $\Delta$s or the detected thrust force. However, in the case where the rotor displacement amount $\Delta$s or the thrust force to act on the rotor 3 due to magnet magnetic fluxes are known beforehand by an inspection or the like performed on a manufacturing line of the motor 1, then the rotor displacement amount detecting sensor 23 may be omitted, and the d-axis current manipulated variable $\Delta$Id_sf may be set to a predetermined value established in advance for each motor 1.

Alternatively, setting data that defines the relationship between the rotational velocity of the rotor 3 and the d-axis current manipulated variable $\Delta$Id_sf (a data table or a relational expression or the like) may be prepared for each motor 1 beforehand and stored in the controller 2 or 72, then the d-axis current manipulated variable $\Delta$Id_sf may be determined on the basis of the setting data. For example, the d-axis current manipulated variable $\Delta$Id_sf in the aforesaid first embodiment may be determined from the rotor rotational velocity Imps on the basis of the setting data (the data table) shown in one of FIGS. 8(a) to 8(d).

In the example illustrated in FIG. 8(a), the d-axis current manipulated variable ΔId_sf is set to zero in a low-velocity range wherein the rotor rotational velocity ωm_s is below a predetermined value ωm1. In a velocity range wherein the rotor rotational velocity ωm_s is the predetermined value ωm1 or more, the d-axis current manipulated variable ΔId_sf is set to a predetermined value in the field weakening direction (a negative value). In the example illustrated in FIG. 8(b), the d-axis current manipulated variable ΔId_sf is set to zero in a low-velocity range wherein the rotor rotational velocity amps is below a predetermined value ωm2. In a rotational velocity range of the predetermined value ωm2 or more, the d-axis current manipulated variable ΔId_sf is increased in the field weakening direction.

In these examples, in the low velocity range, it is less likely that the bearing will be damaged or deteriorated even if a thrust force acts on the bearing, which supports the output shaft 1a of the motor 1 onto the housing. For this reason, the d-axis current manipulated variable ΔId_sf is set to zero or a very small value.

In the example illustrated in FIG. 8(c), when the rotor rotational velocity ωm_s is in the vicinity of a particular amount Vd2_c1 of the d-axis voltage and a correction amount Vq2_c1 rotational velocity ωm3, ωm4 (≈2·ωm3) or ωm5 (≈3·ωm3), the d-axis current manipulated variable ΔId_sf is set to a predetermined value (a negative value), while the d-axis current manipulated variable ΔId_sf is set to zero when the rotor rotational velocity ωm_s is a velocity other than the above. Further, in the example illustrated in FIG. 8(d), when the rotor rotational velocity ωm_s is in the vicinity of a particular rotational velocity ωm3, ωm4 (≈2·ωm3) or ωm5 (≈3·ωm3), the d-axis current manipulated variable ΔId_sf is changed in pulses shaped like mounds in the negative direction.

More specifically, the rotating system, including the rotor 3 of the motor 1, has a specific resonance frequency based on the structure, the size or other factors of the rotating system. When the rotor rotational velocity of the motor 1 is in the vicinity of a rotational velocity corresponding to the resonance frequency, there are cases where a mechanical resonance phenomenon takes place in a thrust direction (the axial direction of the rotor 3) due to the rotational motion of the rotating system of the motor 1 and a thrust force. Therefore, in the examples illustrated in FIGS. 8(c) and 8(d), a field current component in the field weakening direction which has a magnitude equivalent to the d-axis current manipulated variable ΔId_sf is added to the d-axis current of the armature windings 6 and 7 of the motor 1 in the vicinity of the particular rotational velocities ωm3, ωm4, and ωm5 corresponding to the above resonance frequency. This restrains the occurrence of the mechanical resonance phenomenon in the motor 1.

Thus, an embodiment of the aforesaid twelfth aspect of the invention is constructed by determining the d-axis current manipulated variable ΔId_sf in the first embodiment from the rotor rotational velocity ωm_s according to the setting data (the data table) given in one of FIGS. 8(a) to 8(d).

Incidentally, to determine the d-axis current manipulated variable ΔId_sf in the second embodiment by using the setting data as described above, the following procedure, for example, may apply.

If the position of the rotor 3 has been displaced from the neutral position toward the stator 4 (if the thrust force acting on the rotor 3 due to magnet magnetic fluxes is a thrust force directed toward the stator 4 from the stator 5), the d-axis current manipulated variable ΔId_sf determined according to the setting data given in one of FIGS. 8(a) to 8(d) is input to the arithmetic units 74a and 74b. If the position of the rotor 3 has been displaced from the neutral position toward the stator 5 (if the thrust force acting on the rotor 3 due to magnet magnetic fluxes is a thrust force directed toward the stator 5 from the stator 4), the d-axis current manipulated variable ΔId_sf obtained by reversing the sign of the d-axis current manipulated variable ΔId_sf determined according to the setting data given in one of FIGS. 8(a) to 8(d) is input to the arithmetic units 74a and 74b. This constitutes an embodiment of the twelfth aspect of the invention.

Further, to determine the d-axis current manipulated variable ΔId_sf in the aforesaid second modification by using the setting data as described above, the following procedure, for example, may apply.

If the position of the rotor 3 has been displaced from the neutral position toward the stator 4 (if the thrust force acting on the rotor 3 due to magnet magnetic fluxes is a thrust force directed toward the stator 4 from the stator 5), then the arithmetic unit 74b is omitted, and the d-axis current manipulated variable ΔId_sf determined by using the setting data given in one of FIGS. 8(a) to 8(d) is input to the arithmetic unit 74a. Alternatively, the arithmetic unit 74a may be omitted, and the d-axis current manipulated variable ΔId_sf obtained by reversing the sign of the d-axis current manipulated variable ΔId_sf determined by using the setting data given in one of FIGS. 8(a) to 8(d) is input to the arithmetic units 74b.

If the position of the rotor 3 has been displaced from the neutral position toward the stator 5 (if the thrust force acting on the rotor 3 due to magnet magnetic fluxes is a thrust force directed toward the stator 5 from the stator 4), then the arithmetic unit 74a is omitted, and the d-axis current manipulated variable ΔId_sf determined by using the setting data given in one of FIGS. 8(a) to 8(d) is input to the arithmetic unit 74b. Alternatively, the arithmetic unit 74b is omitted, and the d-axis current manipulated variable ΔId_sf obtained by reversing the sign of the d-axis current manipulated variable ΔId_sf determined by using the setting data given in one of FIGS. 8(a) to 8(d) is input to the arithmetic unit 74a.

An embodiment of the aforesaid thirteenth aspect of the invention or the aforesaid fourteenth aspect of the invention is constructed by determining the d-axis current manipulated variable ΔId_sf in the second modification by using the setting data given in one of FIGS. 8(a) to 8(d) as described above.

Fifth Modification

Further, in the embodiments or the modifications described above, the pole configuration of the rotor 3 is the Halbach array; however, the pole configuration does not have to be the Halbach array. For example, the rotor 3 may be provided with only the primary permanent magnets 8 as the permanent magnets thereof.

What is claimed is:

1. A motor controller for an axial-gap motor equipped with a rotor having a permanent magnet, two stators provided on both sides of the rotor in the axial direction of the rotor, and armature windings wrapped around of the two stators, respectively, the motor controller comprising:
  a field current control means for adjusting a field current of a current passed through the armature windings of at least one of the two stators so as to restrain a thrust force acting on the rotor in the axial direction of the rotor,
  wherein the field current control means adjusts the field currents of the armature windings of the two stators by adding field current components in a field weakening direction to the field currents of the armature windings of the two stators when a thrust force attributable to a magnetic flux generated from the permanent magnet acts on the rotor.

2. The motor controller according to claim 1, further comprising:
a thrust force generation detecting means which outputs a detection signal based on a relative position of the rotor in relation to the two stators in the axial direction or a thrust force acting on the rotor,
wherein the field current control means has a means which determines the field current component to be added to the field current of the armature windings of each stator according to an output of the thrust force generation detecting means.

3. The motor controller according to claim 2, wherein the thrust force generation detecting means comprises a pair of search coils attached to the two stators such that they oppose each other.

4. The motor controller according to claim 1, wherein setting data which defines the relationship between the rotational speed of the rotor and the field current component to be added to the field current of the armature windings of each stator is provided beforehand, and the field current control means determines the field current component to be added to the field current the armature windings of each stator on the basis of a detection value of the rotational speed of the rotor and the setting data.

5. A motor controller for an axial-gap motor equipped with a rotor having a permanent magnet, two stators provided on both sides of the rotor in the axial direction of the rotor, and armature windings wrapped around of the two stators, respectively, the motor controller comprising:
a field current control means for adjusting a field current of a current passed through the armature windings of at least one of the two stators so as to restrain a thrust force acting on the rotor in the axial direction of the rotor,
wherein, when a thrust force acting on the rotor due to a magnetic flux generated from the permanent magnet is a thrust force directed from the first stator, which is one of the two stators, toward the second stator, which is the other stator, the field current control means adjusts the field current of the armature windings of the first stator by adding a field current component in the field strengthening direction to the field current of the armature windings of the first stator.

6. The motor controller according to claim 5, further comprising:
a thrust force generation detecting means which outputs a detection signal based on a relative position of the rotor in relation to the two stators in the axial direction or a thrust force acting on the rotor,
wherein the field current control means has a means which determines the field current component to be added to the field current of the armature windings of the first stator according to an output of the thrust force generation detecting means.

7. The motor controller according to claim 6, wherein the thrust force generation detecting means comprises a pair of search coils attached to the two stators such that they oppose each other.

8. The motor controller according to claim 5, wherein setting data which defines the relationship between the rotational speed of the rotor and the field current component to be added to the field current of the armature windings of the first stator is provided beforehand, and the field current control means determines the field current component to be added to the field current the armature windings of the first stator on the basis of a detection value of the rotational speed of the rotor and the setting data.

9. A motor controller for an axial-gap motor equipped with a rotor having a permanent magnet, two stators provided on both sides of the rotor in the axial direction of the rotor, and armature windings wrapped around of the two stators, respectively, the motor controller comprising:
a field current control means for adjusting a field current of a current passed through the armature windings of at least one of the two stators so as to restrain a thrust force acting on the rotor in the axial direction of the rotor,
wherein, when the thrust force acting on the rotor due to a magnetic flux generated from the permanent magnet is a thrust force directed from the first stator, which is one of the two stators, toward the second stator, which is the other stator, the field current control means adjusts the field currents of the armature windings of the two stators by adding the field current component in the field strengthening direction to the field current of the armature winding of the first stator and also adding the field current component in the field weakening direction to the field current of the armature winding of the second stator.

10. The motor controller according to claim 9, further comprising:
a thrust force generation detecting means which outputs a detection signal based on a relative position of the rotor in relation to the two stators in the axial direction or a thrust force acting on the rotor,
wherein the field current control means has a means which determines the field current component to be added to the field current of the armature windings of each stator according to an output of the thrust force generation detecting means.

11. The motor controller according to claim 10, wherein the thrust force generation detecting means comprises a pair of search coils attached to the two stators such that they oppose each other.

12. The motor controller according to claim 9, wherein setting data which defines the relationship between the rotational speed of the rotor and the field current component to be added to the field current of the armature windings of each stator is provided beforehand, and the field current control means determines the field current component to be added to the field current the armature windings of each stator on the basis of a detection value of the rotational speed of the rotor and the setting data.

13. A motor controller for an axial-gap motor equipped with a rotor having a permanent magnet, two stators provided on both sides of the rotor in the axial direction of the rotor, and armature windings wrapped around of the two stators, respectively, the motor controller comprising:
a field current control means for adjusting a field current of a current passed through the armature windings of at least one of the two stators so as to restrain a thrust force acting on the rotor in the axial direction of the rotor; and
a thrust force generation detecting means which outputs a detection signal based on a relative position of the rotor in relation to the two stators in the axial direction or a thrust force acting on the rotor,
wherein, when a thrust force acting on the rotor due to a magnetic flux generated from the permanent magnet is a thrust force directed from a first stator, which is one of the two stators, toward a second stator, which is the other stator, the field current control means adjusts the field current of the armature windings of the second stator by adding the field current component in the field weakening direction to the field current of the armature windings of the second stator, and wherein the field current control means has a means which determines the field current component to be added to the field current of the armature windings of the second stator according to an output of the thrust force generation detecting means.

14. The motor controller according to claim 13, wherein the thrust force generation detecting means comprises a pair of search coils attached to the two stators such that they oppose each other.

15. A motor controller for an axial-gap motor equipped with a rotor having a permanent magnet, two stators provided on both sides of the rotor in the axial direction of the rotor, and armature windings wrapped around of the two stators, respectively, the motor controller comprising:

a field current control means for adjusting a field current of a current passed through the armature windings of at least one of the two stators so as to restrain a thrust force acting on the rotor in the axial direction of the rotor, wherein, when a thrust force acting on the rotor due to a magnetic flux generated from the permanent magnet is a thrust force directed from a first stator, which is one of the two stators, toward a second stator, which is the other stator, the field current control means adjusts the field current of the armature windings of the second stator by adding the field current component in the field weakening direction to the field current of the armature windings of the second stator, and wherein setting data which defines the relationship between the rotational speed of the rotor and the field current component to be added to the field current of the armature windings of the second stator is provided beforehand, and the field current control means determines the field current component to be added to the field current the armature windings of the second stator on the basis of a detection value of the rotational speed of the rotor and the setting data.

* * * * *